US008875829B2

(12) United States Patent
Asakage et al.

(10) Patent No.: US 8,875,829 B2
(45) Date of Patent: Nov. 4, 2014

(54) CONSTRUCTION MACHINE

(71) Applicant: Kobelco Cranes Co., Ltd., Shinagawa-ku (JP)

(72) Inventors: Tomohiko Asakage, Akashi (JP); Hironori Takenaka, Akashi (JP)

(73) Assignee: Kobelco Cranes Co., Ltd., Shinagawa-ku (JP)

( * ) Notice: Subject to any disclaimer, the term of this patent is extended or adjusted under 35 U.S.C. 154(b) by 0 days.

(21) Appl. No.: 13/934,881

(22) Filed: Jul. 3, 2013

(65) Prior Publication Data

US 2014/0007566 A1 Jan. 9, 2014

(30) Foreign Application Priority Data

Jul. 9, 2012 (JP) ................................ 2012-153753

(51) Int. Cl.

| | |
|---|---|
| ***B60K 5/08*** | (2006.01) |
| ***B60K 5/10*** | (2006.01) |
| ***B60K 5/12*** | (2006.01) |
| ***B66C 23/84*** | (2006.01) |
| ***B66C 13/12*** | (2006.01) |
| ***E02F 9/08*** | (2006.01) |
| ***F04C 14/02*** | (2006.01) |

(52) U.S. Cl.
CPC ................. *F04C 14/02* (2013.01); *B66C 23/84* (2013.01); *B66C 13/12* (2013.01); *E02F 9/08* (2013.01)
USPC ............ 180/69.6; 180/9; 180/53.4; 180/53.8; 180/305; 180/306; 180/312

(58) Field of Classification Search
CPC ............... B60K 5/08; B60K 5/10; B60K 5/12
USPC ........... 180/69.6, 9, 53.4, 53.8, 305, 306, 312
See application file for complete search history.

(56) References Cited

U.S. PATENT DOCUMENTS

2006/0027547 A1* 2/2006 Silvestro ...................... 219/133

FOREIGN PATENT DOCUMENTS

JP 11-124879 5/1999

* cited by examiner

*Primary Examiner* — Hau Phan
*Assistant Examiner* — Bryan Evans
(74) *Attorney, Agent, or Firm* — Oblon, Spivak, McClelland, Maier & Neustadt, L.L.P.

(57) ABSTRACT

Provided is a construction machine, wherein an upper slewing body comprises a slewing frame and first and second power units, and wherein the second power unit comprises a second engine, a second controller to control driving of the second engine, a second hydraulic oil tank, a second hydraulic pump configured to be driven by the second engine to thereby suck hydraulic oil from the second hydraulic oil tank and discharge the hydraulic oil toward a hydraulic actuator, a second fuel tank configured to store fuel, and a second support member supporting the second engine, the second hydraulic oil tank, the second hydraulic pump and the second fuel tank, and wherein the second support member is configured to be attachable and detachable with respect to the slewing frame independently of a first support member of the first power unit, and the second hydraulic pump is detachably connected to the hydraulic actuator.

12 Claims, 12 Drawing Sheets

(PRIOR ART)

CONSTRUCTION MACHINE

BACKGROUND OF THE INVENTION

1. Field of the Invention

The present invention relates to a construction machine.

2. Background Art

For example, JP 11-124879A describes an upper slewing body of a construction machine, the upper slewing body comprising two engines.

Further, there has heretofore been known an upper slewing body 520 which comprises a slewing frame 21 and two engines 33 installed to the slewing frame 21, as illustrated in FIG. 12A. There has also heretofore been known an upper slewing body 620 which comprises one side frame 31 and two engines 33 mounted on the side frame 31, as illustrated in FIG. 12B. For example, "DEMAG CC6800" and "DEMAG CC8800-1" (DEMAG: registered trademark) offered by Demag Cranes & Components GmbH are known as a construction machine having an upper slewing body with such a structure.

Meanwhile, in a large construction machine, assembling or disassembling (hereinafter referred to as "assembling/disassembling") of the construction machine is frequently performed for the purpose of transportation of the construction machine or for other purpose. In assembling/disassembling of a construction machine, an assembling-assisting hydraulic actuator is used. The assembling-assisting hydraulic actuator is used for attaching/detaching of a coupling pin for mutually coupling two or more components of a construction machine, and/or jack-up of a car body. Further, an assembling-assisting hydraulic power unit is used to supply hydraulic oil to the assembling-assisting hydraulic actuator. In the following description, a purpose of use of a hydraulic power unit (including the above assembling-assisting hydraulic power unit) which is used for allowing a construction machine in an assembled state to perform an additional operation different from a primary operation thereof will hereinafter be referred to as "additional purpose".

When an owner of a construction machine possess a hydraulic power unit for an "additional purpose", in addition to the construction machine, purchase, transportation, storage, etc., of the hydraulic power unit for the "additional purpose", are liable to impose a financial burden and/or labor on the owner. In this situation, it is conceivable to divert a hydraulic device for performing a primary operation of the construction machine to an "additional purpose". However, it is impossible or difficult for a conventional technique to achieve such diversion, as described below.

In the technique described in the above patent document, two or more devices making up a hydraulic oil supply unit are installed, respectively, on separate frames. Specifically, in an upper slewing body described in FIGS. 3 and 4 of the patent document, a set of an engine (27) and a hydraulic pump (31) is installed on each of right and left cab bed frames (21B), and a set of a fuel tank (40) and a hydraulic oil tank (41) is installed on a main frame (21M). In the above description, each code in brackets corresponds to that described in the patent document. The engine, the hydraulic pump, the fuel tank and the hydraulic oil tank are connected to each other to form one unit, thereby functioning as one device (hydraulic power unit) for supplying hydraulic oil. However, in the case where the set of the engine and the hydraulic pump and the set of the fuel tank and the hydraulic oil tank are installed, respectively, on two separate frames, as in the patent document, when the frames are in a separated state, it is impossible to operate or use the engine, the hydraulic pump, the fuel tank and the hydraulic oil tank, as one device (hydraulic power unit) for supplying hydraulic oil.

In the techniques described in FIGS. 12A and 12B, all of the engines 33 (two engines 33) provided in the construction machine are installed to one frame. Thus, it is impossible to divert only one of the engines 33 to an "additional purpose".

Moreover, when a plurality of components including all of the engines 33 provided in the construction machine are formed as one hydraulic power unit, the resulting hydraulic power unit becomes large in size. Consequently, when this hydraulic power unit is used for an "additional purpose", a space occupied by the hydraulic power unit is increased. Further, the hydraulic power unit having a large size leads to an increase in size and mass of a package during transportation of the hydraulic power unit, which is liable to give rise to a need for a special trailer, for example.

SUMMARY OF THE INVENTION

It is an object of the present invention to allow a power unit to be diverted to an additional purpose different from a primary operation of a construction machine, and make it possible to downsize the power unit, while enhancing flexibility in utilization of the power unit.

According to one aspect of the present invention, there is provided a construction machine which comprises: a lower body; an upper slewing body mounted on the lower body and configured to slew with respect to the lower body; and a hydraulic actuator provided in at least one of the lower body and the upper slewing body and configured to be actuated by receiving a supply of hydraulic oil, wherein: the upper slewing body comprises a slewing frame slewably mounted on the lower body, a first power unit configured to supply hydraulic oil for actuating the hydraulic actuator, and a second power unit configured to supply hydraulic oil for actuating the hydraulic actuator, and wherein the first power unit comprises a first engine, a first controller configured to control driving of the first engine, a first hydraulic oil tank configured to store hydraulic oil, a first hydraulic pump configured to be driven by the first engine to thereby suck hydraulic oil from the first hydraulic oil tank and discharge the hydraulic oil toward the hydraulic actuator, a first fuel tank configured to store fuel to be consumed by the first engine, and a first support member attached to the slewing frame to support the first engine, the first hydraulic oil tank, the first hydraulic pump and the first fuel tank; and the second power unit comprises a second engine, a second controller configured to control driving of the second engine, a second hydraulic oil tank configured to store hydraulic oil, a second hydraulic pump configured to be driven by the second engine to thereby suck hydraulic oil from the second hydraulic oil tank and discharge the hydraulic oil toward the hydraulic actuator, a second fuel tank configured to store fuel to be consumed by the second engine, and a second support member supporting the second engine, the second hydraulic oil tank, the second hydraulic pump and the second fuel tank, and wherein the second support member is configured to be attachable and detachable with respect to the slewing frame independently of the first support member, and the second hydraulic pump is detachably connected to the hydraulic actuator.

DETAILED DESCRIPTION OF THE EMBODIMENTS OF THE INVENTION

First Embodiment

Figure 1:
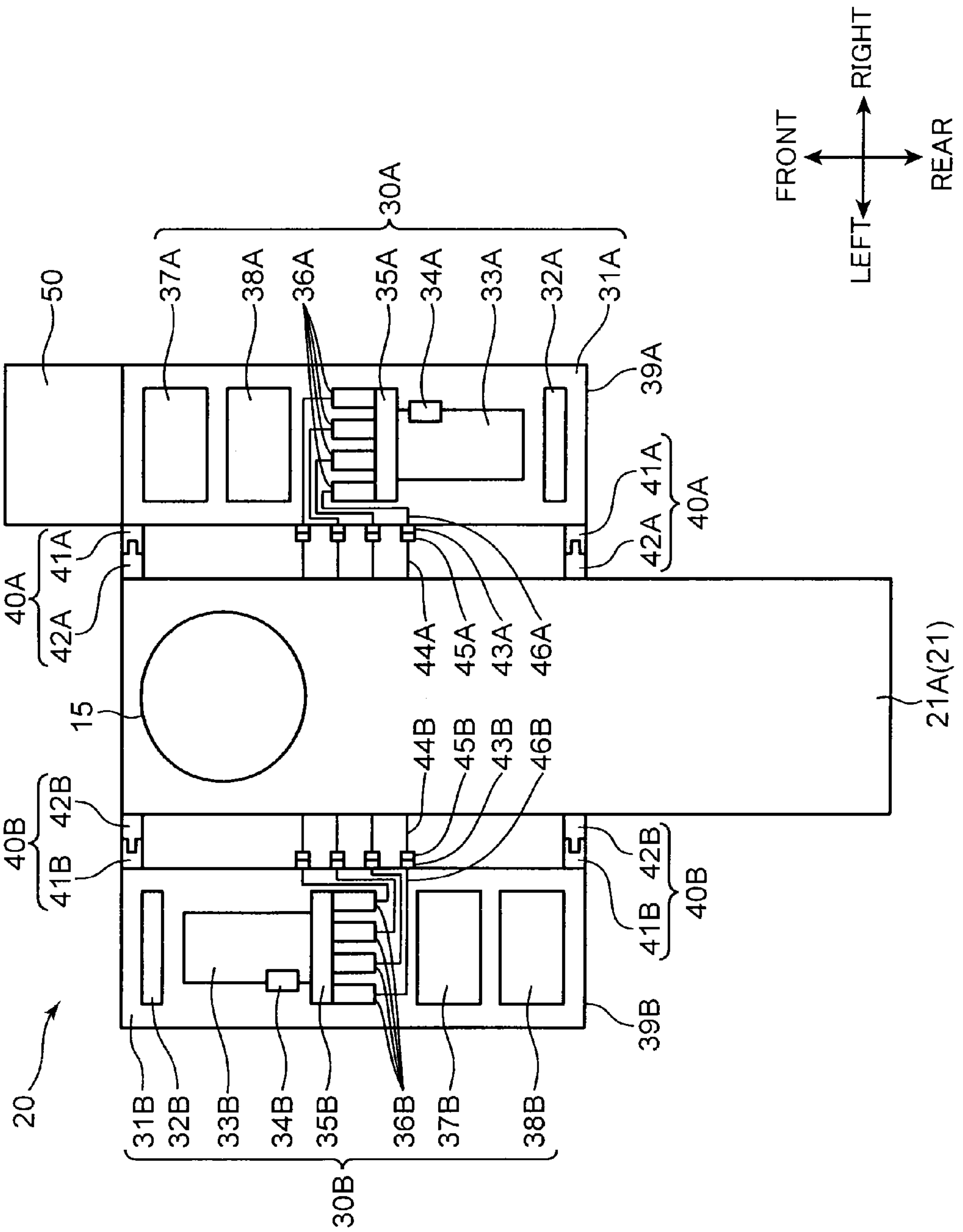
FIG. 1 is a top plan view illustrating an upper slewing body of a construction machine according to a first embodiment of the present invention.

With reference to FIGS. 1 to 5, a construction machine 1 (see FIG. 2) according to a first embodiment of the present invention will be described.

For example, the construction machine 1 may be a crane or a hydraulic shovel. The construction machine 1 is a large machine of a type which is transported via a public roadway in a disassembled state. The construction machine 1 comprises a lower body 10, and an upper slewing body 20 attached onto the lower body 10 through a slewing bearing 15.

The lower body 10 is a part for allowing propelling of the construction machine 1. For example, the lower body 10 may be a wheel-type lower propelling body or may be a crawler-type lower propelling body. The lower body 10 comprises a car body 11 onto which the upper slewing body 20 is mounted, and a pair of crawlers 13 attached, respectively, to right and left sides of the car body 11. Each of the crawlers 13 has a propelling motor 51 (see FIG. 3) for driving the crawler 13 to cause propelling of the construction machine 1. The propelling motor 51 is composed of a hydraulic motor configured to be actuated by receiving a supply of hydraulic oil (hydraulic pressure). Thus, it is equivalent to a hydraulic actuator 55.

Figure 2:
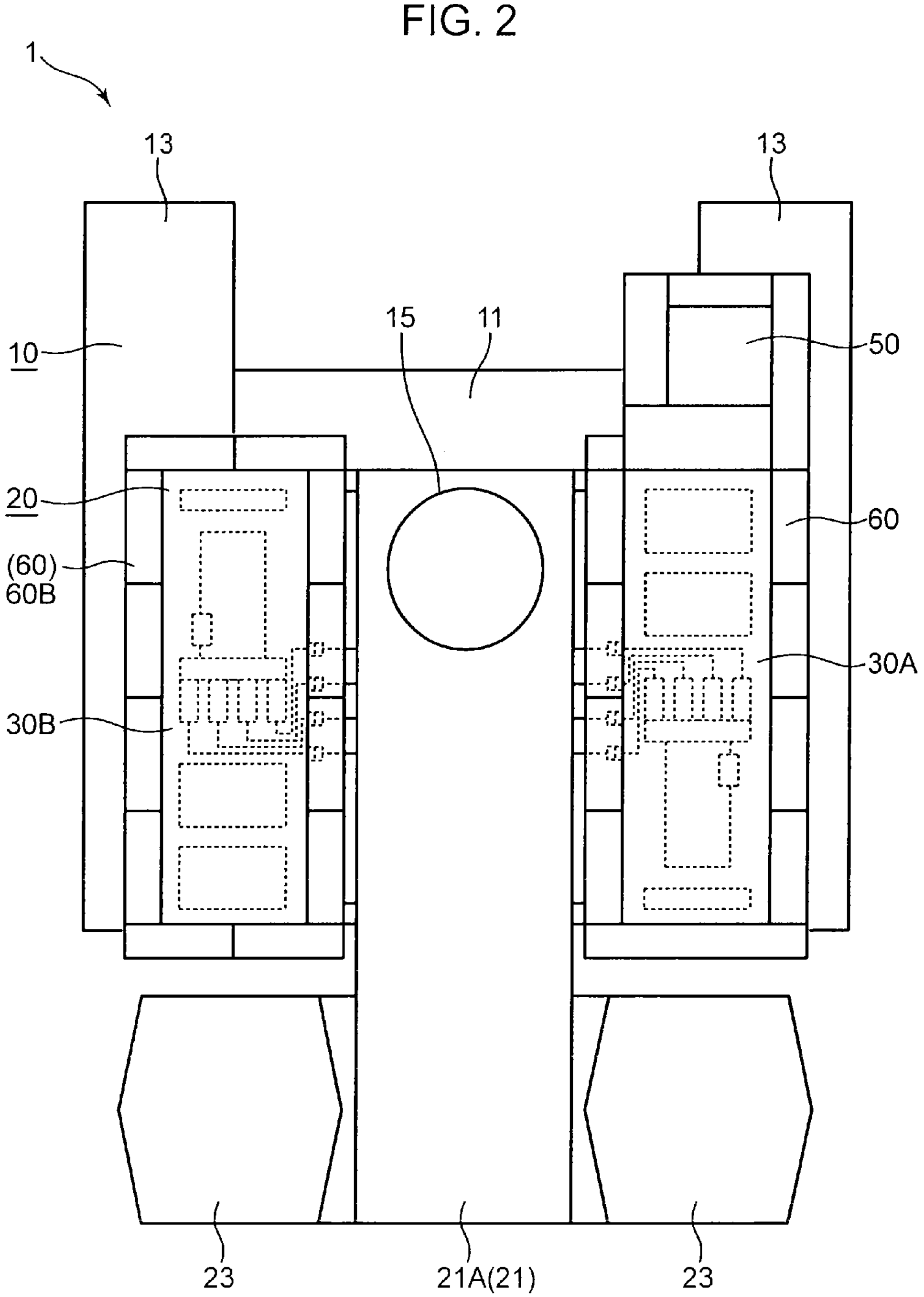
FIG. 2 is a top plan view illustrating the construction machine according to the first embodiment, which comprises the upper slewing body illustrated in FIG. 1.

The upper slewing body 20 is supported with respect to the lower body 10 through the slewing bearing 15. The upper slewing body 20 is slewable about a center of the slewing bearing 15. As illustrated in FIG. 2, the upper slewing body 20 comprises a slewing frame 21, a plurality of counterweights 23, a first power unit 30A, a second power unit 30B, an operator's cab 50 and a work platform 60. The slewing frame 21 is mounted on the lower body 10. The plurality of counterweights 23, the first power unit 30A and the second power unit 30B are attached to the slewing frame 21, individually. The operator's cab 50 is attached to the first power unit 30A. The work platform 60 is attached, for example, to the second power unit 30B.

The slewing frame 21 is a structural member serving as a base of the upper slewing body 20. As illustrated in FIG. 2, the slewing frame 21 is mounted to the car body 11 through the slewing bearing 15. As illustrated in FIG. 1, the slewing frame 21 has a slewing frame body 21A, two right slewing frame brackets 42A, and two left slewing frame brackets 42B. The slewing frame body 21A is a portion of the slewing frame 21 which accounts for a major part thereof, and is slewably mounted on the car body 11 through the slewing bearing 15. The two right slewing frame brackets 42A are provided, respectively, at front and rear ends of a right lateral side of the slewing frame body 21A, in spaced-apart relation. The two left slewing frame brackets 42B are provided, respectively, at front and rear ends of a left lateral side of the slewing frame body 21A, in spaced-apart relation. For example, a boom or arm (not illustrated) is attached to a front end region of the slewing frame body 21A, in a raisable and lowerable manner. A non-illustrated hook device is suspended from a tip end of the boom or arm through a rope.

Figure 3:
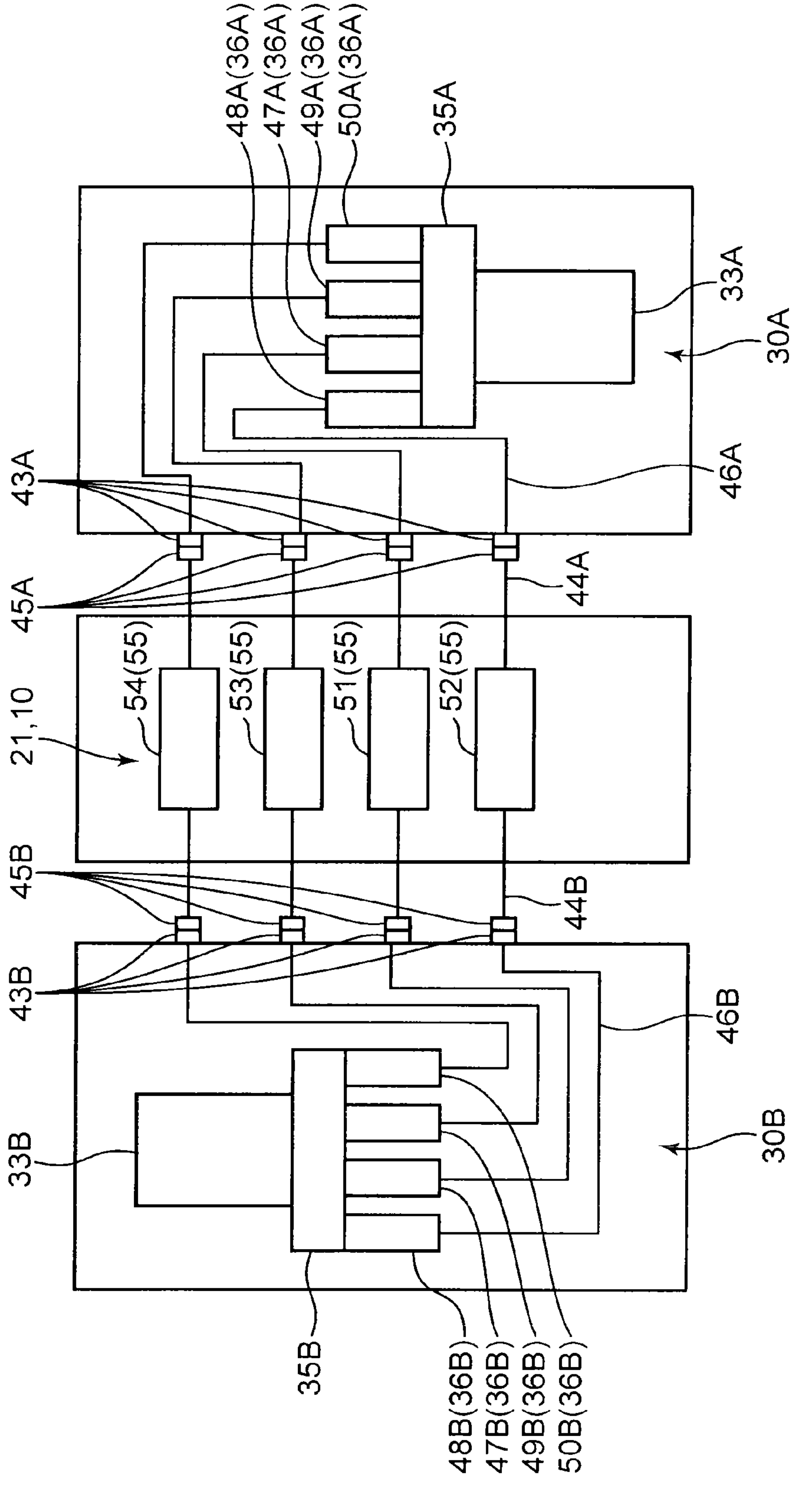
FIG. 3 is a schematic diagram illustrating a connection between each hydraulic pump and a corresponding hydraulic motor in the construction machine according to the first embodiment.

The upper slewing body 20 further comprises a slewing mechanism having a slewing motor 52 (see FIG. 3), a boom-hoisting winch having a boom-hoisting motor 53 (see FIG. 3), and a hoisting winch having a hoisting motor 54 (see FIG. 3). The slewing mechanism, the boom-hoisting winch and the hoisting winch are provided on the slewing frame 21. The slewing mechanism is designed to slew the slewing frame 21 of the upper slewing body 20 with respect to the car body 11 of the lower body 10, and configured to slew the upper slewing body 20 by a driving force of the slewing motor 52. The boom-hoisting winch is designed to raise and lower the boom or arm, and configured to perform an operation of raising and lowering the boom or arm according to actuation of the boom-hoisting motor 53. The hoisting winch is designed to hoist a suspended load in the case where the construction machine 1 is a crane, and configured to perform an operation of hoisting a suspended load according to actuation of the hoisting motor 54. Each of the slewing motor 52, the boom-hoisting motor 53 and the hoisting motor 54 is a hydraulic motor configured to be actuated by receiving a supply of hydraulic oil (hydraulic pressure). Thus, each of them is equivalent to a hydraulic actuator 55. Instead of the boom-hoisting motor 53 and the boom-hoisting winch to be driven by the boom-hoisting motor 53, a hydraulic cylinder for raising and lowering the boom or arm may be used. In this case, the hydraulic cylinder is encompassed within a concept of "hydraulic actuator" set forth in the appended claims.

A plurality of right actuator-side hydraulic pipes 44A are provided to extend rightwardly from the slewing frame body 21A, and a plurality of left actuator-side hydraulic pipes 44B are provided to extend leftwardly from the slewing frame body 21A. Each of pairs of the right actuator-side hydraulic pipes 44A and the left actuator-side hydraulic pipes 44B are connected to a corresponding one of the hydraulic actuators 55, and configured to allow hydraulic oil to the corresponding hydraulic actuator 55 therethrough. A right actuator-side coupling member 45A is provided at an end of each of the right actuator-side hydraulic pipes 44A on a side opposite to the corresponding hydraulic actuator 55. A left actuator-side coupling member 45B is provided at an end of each of the left actuator-side hydraulic pipes 44B on a side opposite to the corresponding hydraulic actuator 55. Each of the right actuator-side coupling members 45A is composed of a quick coupler which is readily connectable to an aftermentioned first pump-side coupling member 43A by a simple operation of fitting it to the first pump-side coupling member 43A, and each of the left actuator-side coupling members 45B is composed of a quick coupler which is readily connectable to an aftermentioned second pump-side coupling member 43B by a simple operation of fitting it to the second pump-side coupling member 43B.

Each of the counterweights 23 is a weight member which is attached to a rear end of the slewing frame 21.

As illustrated in FIG. 1, the first power unit 30A comprises a first engine 33A, and peripheral devices (accessory device group) thereof. The first power unit 30A is designed to supply hydraulic oil for actuating each of the hydraulic actuators 55 (see FIG. 3). The first power unit 30A is attached to the slewing frame 21. The first power unit 30A is disposed rightward of the slewing frame 21. The first power unit 30A is attachable and detachable with respect to the slewing frame 21.

The first power unit 30A comprises a plurality of devices necessary for driving the construction machine in a state in which the second power unit 30B is detached from the slewing frame 21. Specifically, the first power unit 30A comprises: a first side frame 31A attached to the slewing frame 21; a first cooling device 32A, a first engine 33A, a first power divider 35A, a plurality of first hydraulic pumps 36A, a first fuel tank 37A and a first hydraulic oil tank 38A, which are installed on the first side frame 31A, individually; a first controller 34A attached to the first engine 33A; a plurality of first pump-side hydraulic pipes 46A each connected to a corresponding one of the first hydraulic pump 36A to allow hydraulic oil discharged from the corresponding first hydraulic pump 36A to flow therethrough; and a first pump-side coupling member 43A provided at an end of each of the first pump-side hydraulic pipe 46A on a side opposite to a corresponding one of the first hydraulic pumps 36A and separably coupled to a corresponding one of the right actuator-side coupling members 45A.

The first side frame 31A is a frame disposed rightward of the slewing frame 21, and is also called as “side deck” or “side bed”. The first side frame 31A is encompassed within a concept of “first support member” set forth in the appended claims. The first side frame 31A is configured to be attachable and detachable with respect to the slewing frame 21, independently of an aftermentioned second side frame 31B. The first side frame 31A has: a first side frame body 39A which supports the first cooling device 32A, the first engine 33A, the first power divider 35A, the first hydraulic pump 36A, the first fuel tank 37A and the first hydraulic oil tank 38A; and two first side frame brackets 41A attached to the first side frame body 39A. For example, the first cooling device 32A, the first engine 33A, the first power divider 35A, the first hydraulic pump 36A, the first hydraulic oil tank 38A and the first fuel tank 37A are arranged in this order in a direction from a rear end to a front end of the first side frame body 39A. It should be noted that this arrangement may be changed. For example, the arrangement of the first hydraulic oil tank 38A and the first fuel tank 37A may be changed back to front. Each of the components 31A to 38A, 43A, 46A of the first power unit 30A has the same function as a respective one of aftermentioned components 31B to 38B, 43B, 46B of the second power unit 30B.

A combination of the first side frame bracket 41A, the right slewing frame bracket 42A provided at a position of the right lateral side of the slewing frame 21 corresponding to the first side frame bracket 41A, and a non-illustrated coupling pin for coupling the two brackets 41A, 42A makes up a first power unit attaching-detaching mechanism 40A for allowing the first side frame body 39A of the first power unit 30A to be detachably connected to the slewing frame body 21A, i.e., for allowing the first side frame 31A to be detachably attached to the slewing frame 21. A specific configuration and function of the first power unit attaching-detaching mechanism 40A are the same as those of an aftermentioned second power unit attaching-detaching mechanism 40B.

The plurality of first hydraulic pumps 36A consist of a first propelling hydraulic pump 47A, a first slewing hydraulic pump 48A, a first boom-hoisting hydraulic pump 49A and a first hoisting hydraulic pump 50A. A specific configuration and function of each of the first hydraulic pumps 47A to 50A are the same as those of a respective one of aftermentioned second hydraulic pumps 47B to 50B. Each of the first hydraulic pumps 47A to 50A is detachably connected to a corresponding one of the hydraulic actuators 55 via corresponding ones of the first pump-side hydraulic pipes 46A, the first pump-side coupling members 43A, the right actuator-side coupling members 45A and the right actuator-side hydraulic pipes 44A.

The second power unit 30B comprises a second engine 33B, and peripheral devices (accessory device group) thereof. Specifically, the second power unit 30B is formed by collecting or packaging the second engine 33B and the peripheral devices. The second power unit 30B is designed to supply hydraulic oil for actuating each of the hydraulic actuators 55. The second power unit 30B is separate from the first power unit 30A. The second power unit 30B is disposed leftward of the slewing frame 21. That is, the second power unit 30B is disposed on a side opposite to the first power unit 30A with respect to the slewing frame 21. The second power unit 30B is configured to be attachable and detachable with respect to the slewing frame 21, independently of the first power unit 30A.

The second power unit 30B is configured to be divertable to an (aftermentioned) additional purpose different from a purpose of driving the construction machine 1 in an assembled state (see FIG. 2). The second power unit 30B comprises a plurality of devices necessary for allowing the second power unit 30B to be usable as a hydraulic power unit by itself. The second power unit 30B comprises: a second side frame 31B attached to the slewing frame 21; a second cooling device 32B, a second engine 33B, a second power divider 35B, a plurality of second hydraulic pumps 36B, a second fuel tank 37B and a second hydraulic oil tank 38B, which are installed on the second side frame 31B, individually; a second controller 34B attached to the second engine 33B; a plurality of second pump-side hydraulic pipes 46B each connected to a corresponding one of the second hydraulic pump 36B to allow hydraulic oil discharged from the corresponding second hydraulic pump 36B to flow therethrough; and a second pump-side coupling member 43B provided at an end of each of the second pump-side hydraulic pipe 46B on a side opposite to a corresponding one of the second hydraulic pumps 36B and separably coupled to a corresponding one of the left actuator-side coupling members 45B.

The second side frame 31B is a frame disposed leftward of the slewing frame 21, and is also called as “side deck” or “side bed”. The second side frame 31B is encompassed within a concept of “second support member” set forth in the appended claims. The second side frame 31B is configured to be attachable and detachable with respect to the slewing frame 21, independently of the first side frame 31A. The second side frame 31B has: a second side frame body 39B which supports the second cooling device 32B, the second engine 33B, the second power divider 35B, the second hydraulic pump 36B, the second fuel tank 37B and the second hydraulic oil tank 38B; and two second side frame brackets 41B attached to the second side frame body 39B and detachably connected to the corresponding left slewing frame brackets 42B. For example, the second cooling device 32B, the second engine 33B, the second power divider 35B, the second hydraulic pump 36B, the second fuel tank 37B and the second hydraulic oil tank 38B are arranged in this order in a direction from a front end to a rear end of the second side frame body 39B.

The second side frame 31B forms a bottom of the second power unit 30B. A combination of the second side frame bracket 41B, the left slewing frame bracket 42B provided at a position of the left lateral side of the slewing frame 21 corresponding to the second side frame bracket 41B, and a non-illustrated coupling pin for coupling the two brackets 41B, 42B makes up a second power unit attaching-detaching mechanism 40B for allowing the second side frame body 39B of the second power unit 30B to be detachably connected to the slewing frame body 21A, i.e., for allowing the second side frame 31B to be detachably attached to the slewing frame 21.

Each of the second side frame brackets 41B and the left slewing frame brackets 42B is formed with a hole. The second side frame bracket 41B and the left slewing frame bracket 42B are coupled together and fixed to each other by combining the two brackets 41B, 42B together and fittingly inserting a coupling pin into the aligned holes of the two brackets 41B, 42B. The coupling pin is configured to be detachably inserted into the aligned holes of the two brackets 41B, 42B. Thus, the second side frame bracket 41B can be separated from the left slewing frame bracket 42B by pulling out the coupling pin from the holes of the two brackets 41B, 42B.

In the first embodiment, the second power unit attaching-detaching mechanism 40B is provided at two positions. Alternatively, the second power unit attaching-detaching mechanism 40B may be provided at three or more positions. The same applies to the first power unit attaching-detaching mechanism 40A.

The second cooling device 32B is a radiator for cooling coolant or the like of the second engine 33B.

The second engine 33B is a driving source for the second hydraulic pumps 36B.

The second controller 34B is a device for controlling driving of the second engine 33B. The second controller 34B is configured to control start, stop, speed and others of the second engine 33B.

The second power divider 35B is configured to distribute a driving force of the second engine 33B into the plurality of the second hydraulic pumps 36B.

Each of the second hydraulic pumps 36B is configured to be driven by the second engine 33B through the second power divider 35B to thereby suck hydraulic oil from the second hydraulic oil tank 38B and discharge (supply) the hydraulic oil toward (to) a corresponding one of the hydraulic actuators 55. The plurality of second hydraulic pumps 36B consist of a second propelling hydraulic pump 47B, a second slewing hydraulic pump 48B, a second boom-hoisting hydraulic pump 49B and a second hoisting hydraulic pump 50B. The second propelling hydraulic pump 47B is operable to supply hydraulic oil to the propelling motor 51. The second slewing hydraulic pump 48B is operable to supply hydraulic oil to the slewing motor 52. The second boom-hoisting hydraulic pump 49B is operable to supply hydraulic oil to the boom-hoisting motor 53. The second hoisting hydraulic pump 50B is operable to supply hydraulic oil to the hoisting motor 54.

Each of the second hydraulic pumps 36B is detachably connected to a corresponding one of the hydraulic actuators 55 via corresponding ones of the second pump-side hydraulic pipes 46B, the second pump-side coupling members 43B, the left actuator-side coupling members 45B and the left actuator-side hydraulic pipes 44B. Each of the second pump-side coupling members 43B is composed of a quick coupler which is readily connectable to a corresponding one of the left actuator-side coupling member 45B by a simple operation of fitting it to the corresponding left actuator-side coupling member 45B. Each of the second pump-side coupling members 43B is coupled to a corresponding one of the left actuator-side coupling members 45B to allow hydraulic oil discharged from a corresponding one of the second hydraulic pumps 36B to the second pump-side hydraulic pipe 46B to flow from the second pump-side hydraulic pipe 46B to a corresponding one of the left actuator-side hydraulic pipes 44B.

The second fuel tank 37B is a container for storing fuel to be consumed by the second engine 33B, and is connected to the second engine 33B.

The second hydraulic oil tank 38B is a container for storing hydraulic oil to be supplied to the second hydraulic pumps 36B, and is connected to each of the second hydraulic pumps 36B.

It should be noted that each of the components 31A to 38A of the first power unit 30A and a respective one of the components 31B to 38B of the second power unit 30B are not necessarily identical to each other in terms of performance or the like. Specifically, as one example, the first engine 33A and the second engine 33B may be different from each other in terms of a maximum output power. As another example, the first hydraulic oil tank 38A and the second hydraulic oil tank 38B may be different from each other in terms of a capacity.

The operator's cab 50 is a room allowing an operator of the construction machine 1 (see FIG. 2) to stay therein. The operator's cab 50 is attached (fixed), for example, to a front end of the first side frame 31A. Alternatively, the operator's cab 50 may be attached, for example, to a front end of the slewing frame 21 (see FIG. 7).

The work platform 60 (see FIG. 2) is a stage (corridor) for use in maintenance work or the like. For example, a netlike plate-shaped member with a handrail (not illustrated) may be used as the work platform 60. The work platform 60 includes a work platform 60B attached around the second power unit 30B. The work platform 60 may also be attached around the first power unit 30A and the operator's cab 50. The work platform 60B is configured to be attachable and detachable with respect to the second power unit 30B, or to be storable with respect to the second power unit 30B. In the case where the work platform 60B is configured to be storable with respect to the second power unit 30B, the work platform 60B is stored with respect to the second power unit 30B in such a manner that the work platform 60B is attached to a peripheral surface (a roof surface, front and rear surfaces, and right and left lateral surfaces) of the second power unit 30B in a posture where the plate-shaped member of the work platform 60B is located parallel to the peripheral surface of the second power unit 30B, for example. Further, the work platform 60B may be stored inside the second power unit 30B, i.e., stored inward of the peripheral surface of the second power unit 30B.

Next, an example of a usage mode of the second power unit 30B, etc., will be described. The following description will be made on an assumption that the first power unit 30A is attached to the slewing frame 21.

(Usage Mode I)

The second power unit 30B is used as a power source for the construction machine 1 in the assembled state. This is a primary purpose of the second power unit 30B. In this case, the second power unit 30B is attached to the slewing frame 21, i.e., each of the second side frame brackets 41B is coupled to a corresponding one of the left slewing frame brackets 42B, and each of the second pump-side coupling members 43B is connected to a corresponding one of the left actuator-side coupling member 45B. Then, in this state, the second power unit 30B operates to actuate the propelling motor 51, the slewing motor 52, the boom-hoisting motor 53 and the hoisting motor 54 which are the hydraulic actuators 55 for driving the construction machine 1. In the usage mode I, the first propelling hydraulic pump 47A and the second propelling hydraulic pump 47B operate to actuate the propelling motor 51. Further, the first slewing hydraulic pump 48A and the second slewing hydraulic pump 48B operate to actuate the slewing motor 52. The first boom-hoisting hydraulic pump 49A and the second boom-hoisting hydraulic pump 49B operate to actuate the boom-hoisting motor 53. The first hoisting hydraulic pump 50A and the second hoisting hydraulic pump 50B operate to actuate the hoisting motor 54. It should be noted that each of the first hydraulic pumps 47A to 50A of the first power unit 30A and a respective one of the second hydraulic pumps 47B to 50B of the second power unit 30B may be arranged to actuate different ones of the hydraulic actuators.

(Usage Mode II)

Figure 4:
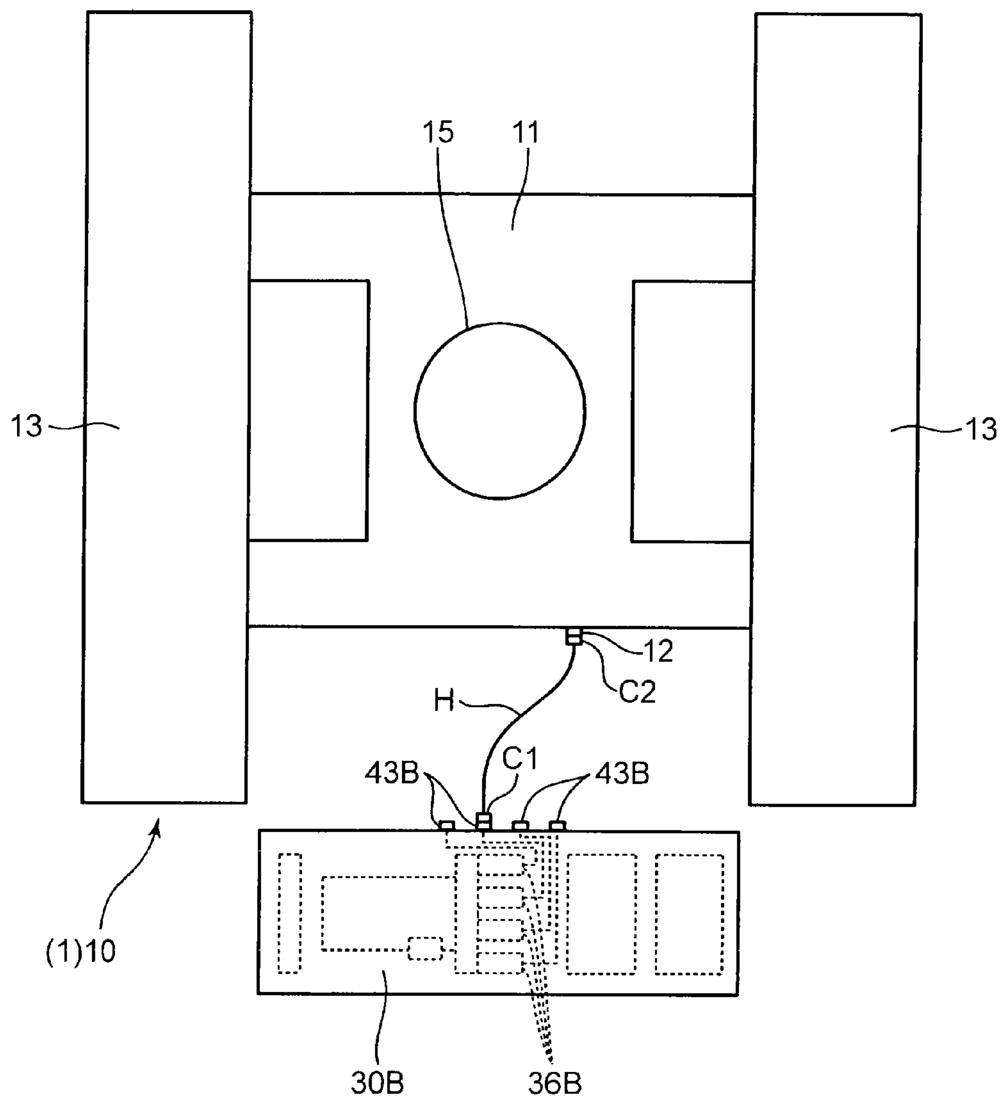
FIG. 4 is a diagram illustrating a state in which a second power unit of the upper slewing body illustrated in FIG. 1 is used as an assembling-assisting hydraulic power unit.
Figure 5:
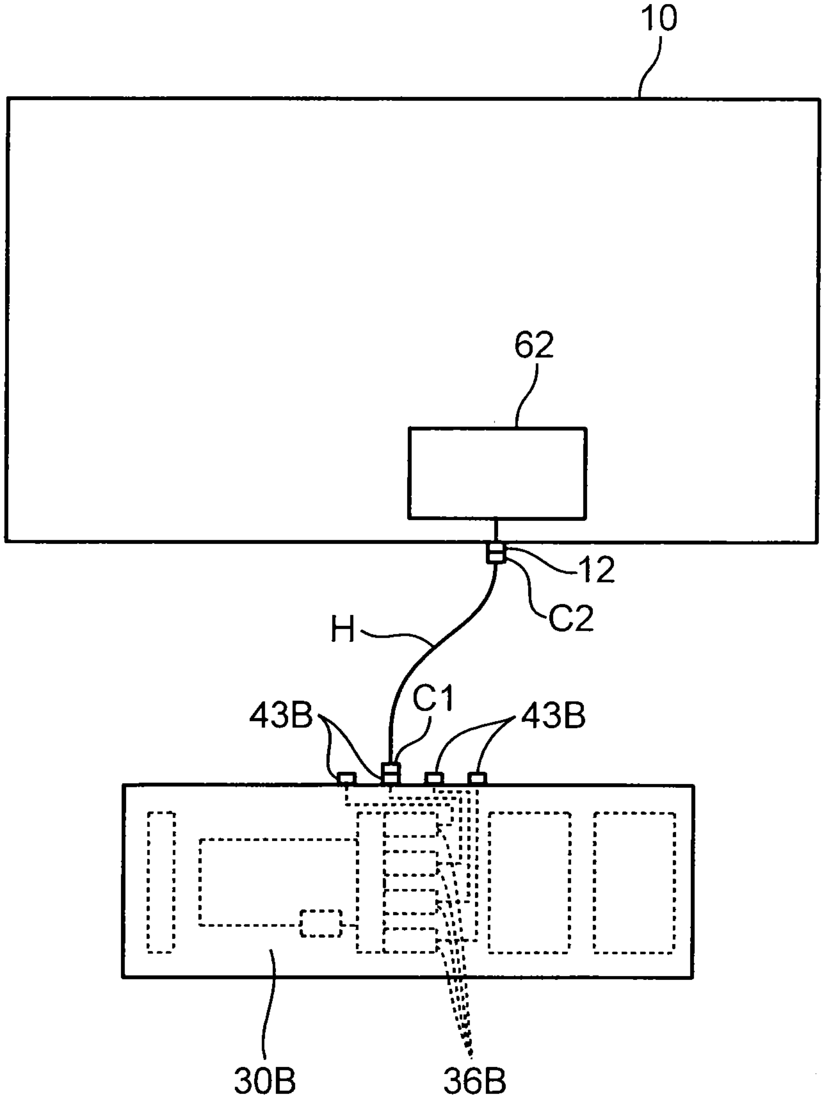
FIG. 5 is a schematic diagram illustrating a connection between an auxiliary actuator and a hydraulic pump of the second power unit.

The construction machine 1 comprises an auxiliary actuator 62 (see FIG. 5) which is a hydraulic actuator for use in assisting assembling and disassembling of the construction machine 1. The second power unit 30B can be used as a power source of the auxiliary actuator 62, i.e., an assembling-assisting hydraulic power unit. In this case, the second power unit 30B is detached from the slewing frame 21 of the upper slewing body 20, and disposed around the lower body 10 of the construction machine 1, as illustrated in FIG. 4. The lower body 10 of the construction machine 1 is provided with a coupling member 12 connecting to the auxiliary actuator 62. Then, a hydraulic hose H is connected to the auxiliary actuator 62 via the coupling member 12. Specifically, a coupling member C1 is attached to one end of the hydraulic hose H, and a coupling member C2 is attached to the other end of the hydraulic hose H. When the coupling member C2 at the other end of the hydraulic hose H is coupled to the coupling member 12 of the lower body 10, the hydraulic hose H is connected to the coupling member 12. The hydraulic hose H is encompassed within a concept of "auxiliary hydraulic pipe" set forth in the appended claims. The coupling member C2 is encompassed within a concept of "auxiliary pipe coupling member" set forth in the appended claims.

Each of the second pump-side coupling members 43B of the second power unit 30B is configured to be coupleable to the coupling member C1 at the one end of the hydraulic hose H. Specifically, each of the second pump-side coupling members 43B, and the coupling member C1 at the one end of the hydraulic hose H, are a pair of quick couplers which are separably couplable together. The coupling member C1 at the one end of the hydraulic hose H is coupled to a selected one of the second pump-side coupling members 43B. In this state, hydraulic oil is supplied from a corresponding one of the second hydraulic pumps 36B to the auxiliary actuator 62 via a corresponding one of the second pump-side hydraulic pipes 46B, the selected second pump-side coupling member 43B, the coupling member C1, the hydraulic hose H, the coupling member C2 and the coupling member 12, so that the auxiliary actuator 62 is driven.

When the second power unit 30B is used in the usage mode II, the work platform 60B (see FIG. 2) is preliminarily detached from the second power unit 30B or stored with respect to the second power unit 30B. It is to be noted that FIG. 4 illustrates a state during assembling or disassembling of the construction machine 1, wherein only the lower body 10 is illustrated as the construction machine 1.

Now, an example of the auxiliary actuator 62 of the construction machine 1 will be described below.

(i) For example, the auxiliary actuator 62 includes a hydraulic cylinder for attaching and detaching the coupling pin for mutually coupling two components of the construction machine 1. Specifically, the auxiliary actuator 62 includes, for example, a hydraulic cylinder for attaching and detaching a coupling pin (not illustrated) of the power unit attaching-detaching mechanisms 40A, 40B (see FIG. 1), and a hydraulic cylinder for attaching and detaching a coupling pin for coupling the boom or arm (not illustrated) and the slewing frame 21 (see FIG. 2) together. In the large construction machine 1, a coupling pin is also large in size, so that it is difficult or impossible to attach and detach such a coupling pin by humans. Therefore, it is necessary to use the coupling pin attaching-detaching hydraulic cylinder.

(ii) The auxiliary actuator 62 further includes a hydraulic cylinder for jacking up the car body 11 when the crawlers 13 are attached and detached with respect to the car body 11 illustrated in FIG. 4.

(Usage Mode III)

Figure 6:
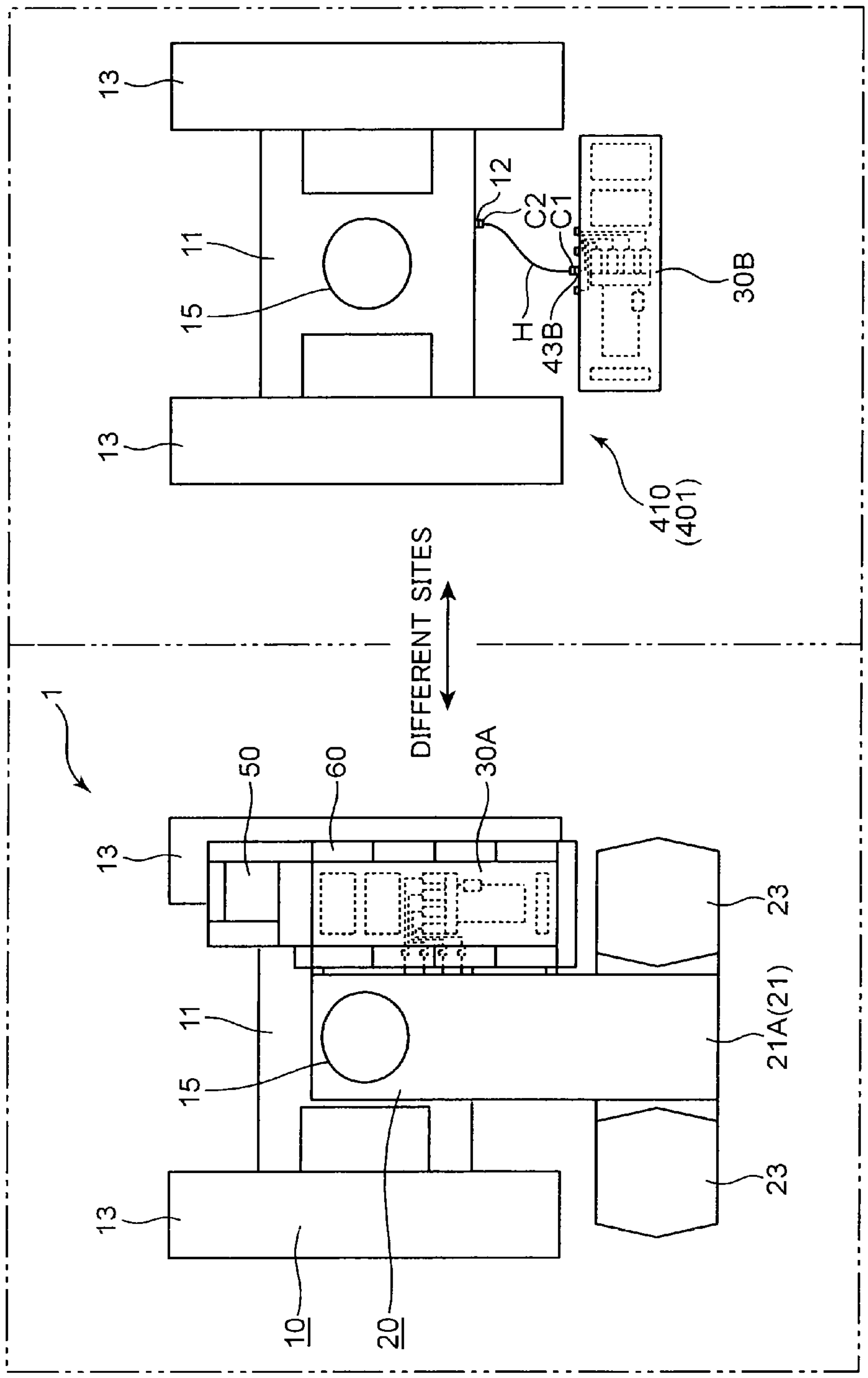
FIG. 6 is a diagram illustrating a state in which first and second power units of the upper slewing body illustrated in FIG. 1 are used in different construction machines, respectively.

As illustrated in FIG. 6, the second power unit 30B can be used as an assembling-assisting hydraulic power unit for a different construction machine 401 from the construction machine 1 originally equipped with the second power unit 30B. In this case, for example, the construction machine 401 may be located at a different site from a site where the construction machine 1 is located. As above, the second power unit 30B is used for the construction machine 401, while using the first power unit 30A as a power source for a portion of the construction machine 1 other than the second power unit 30B. In this case, as compared to a situation where both of the first power unit 30A and the second power unit 30B are used as a power source of the construction machine 1, as illustrated in FIG. 2, i.e., the usage mode I, a power (driving force) for the construction machine 1 will be reduced, for example, to one-half. It is to be noted that FIG. 6 illustrates a state during assembling or disassembling of the construction machine 401, wherein only a lower body 410 is illustrated as the construction machine 401. When the second power unit 30B is used as an assembling-assisting hydraulic power unit of the construction machine 401, as in the above usage mode III, the first power unit 30A may be kept in a standby state or stored, without being driven.

(Effect 1)

Next, an advantageous effect obtainable by the upper slewing body 20 of the construction machine 1 according to the first embodiment will be described.

The upper slewing body 20 comprises the slewing frame 21, the first power unit 30A attached to the slewing frame 21, and the second power unit 30B which is separate from the first power unit 30A and is configured to be attachable and detachable with respect to the slewing frame 21.

As illustrated in FIG. 1, the first power unit 30A comprises the first engine 33A, the first controller 34A for controlling the first engine 33A, the first hydraulic pump 36A configured to be driven by the first engine 33A, the first fuel tank 37A connected to the first engine 33A, and the first hydraulic oil tank 38A connected to the first hydraulic pump 36A. The second power unit 30B comprises the second engine 33B, the second controller 34B for controlling the second engine 33B, the second hydraulic pump 36B configured to be driven by the second engine 33B, the second fuel tank 37B connected to the second engine 33B, and the second hydraulic oil tank 38B connected to the second hydraulic pump 36B.

In the construction machine according to the first embodiment, each of the first power unit 30A and the second power unit 30B is equipped with a plurality of devices necessary for operating independently. Thus, in the first embodiment, the following effects (a) and (b) can be obtained.

(a) The second power unit 30B is operable independently and is attachable and detachable with respect to the slewing frame 21. Thus, it is possible to detach the second power unit 30B from the slewing frame 21 and divert the detached second power unit 30B to a purpose different from a purpose of driving the construction machine 1 in the assembled state. The purpose different from the purpose of driving the construction machine 1 in the assembled state will hereinafter be referred to as "additional purpose".

(b) The first power unit 30A is operable independently. Thus, even in a state in which the second power unit 30B is detached from the slewing frame 21, it is possible to drive a portion of the construction machine 1 other than the second power unit 30B, by using only the first power unit 30A.

The power units 30A, 30B can be used as described in the effects (a) and (b), which provides high flexibility in utilization of the components of the upper slewing body 20. For example, the first power unit 30A and the second power unit 30B can be concurrently used at different sites, respectively.

Further, as a result of being able to divert the second power unit 30B to an "additional purpose", the following effects (c) and (d) can be obtained.

(c) An owner of the upper slewing body 20 is free of a need for additionally purchasing and storing a hydraulic power unit for an "additional purpose". This effect is valid, particularly, when the construction machine 1 is equipped with a coupling pin attaching-detaching hydraulic cylinder. The reason is as follows. Generally, when the construction machine is in the assembled state, a rod of the coupling pin attaching-detaching hydraulic cylinder is maintained in an extended state, i.e., in a protruded state. When the rod is in the extended state, an amount of hydraulic oil within a hydraulic oil tank (38B) is reduced as compared to a state in which the rod is in a retracted state. Thus, considering this reduction in amount of hydraulic oil, it is necessary to increase a capacity of the hydraulic oil tank (38B), so that there is no choice but to increase in size of a hydraulic power unit for an "additional purpose". As a result, an owner of the upper slewing body 20 who additionally purchases and stores a hydraulic power unit for an "additional purpose" will bear a large financial burden. In contrast, an owner who possesses the upper slewing body 20 in the first embodiment is free of a need for additionally purchasing and storing a hydraulic power unit for an "additional purpose", which makes it possible to eliminate the need for bearing a financial burden due to this hydraulic power unit, and prevent an increase in financial burden due to an increase in size of the hydraulic power unit.

(d) The second power unit 30B can be diverted to an "additional purpose", so that the second power unit 30B can be utilized when there is no work to be conducted by the construction machine 1 equipped with the two power units 30A, 30B. Thus, it becomes possible to increase a chance of utilization (operating rate) of the upper slewing body 20.

(Effect 2)

The second power unit 30B is separate from the first power unit 30A, and is attachable and detachable with respect to the slewing frame 21 independently from the first power unit 30A. Supposing that the second power unit 30B and the first power unit 30A are integrated together, for example, that the two power units 30A, 30B are mounted on one inseparable frame, the second power unit 30B has to be transported in a manner integral with that the first power unit 30A. This causes an increase in size and weight of a package during transportation of the second power unit 30B. In contrast, in the first embodiment, the second power unit 30B is separate from the first power unit 30A, and is attachable and detachable with respect to the slewing frame 21. Thus, the second power unit 30B can be separated from the first power unit 30A and transported, so that it becomes possible to reduce a size and weight of a package during transportation of the second power unit 30B. In addition, it becomes possible to reduce a space to be occupied by the second hydraulic power unit 30B when the second hydraulic power unit 30B is diverted to an "additional purpose".

(Effect 3)

The upper slewing body 20 comprises the operator's cab 50 attached to the slewing frame 21 or the first power unit 30A. In this configuration, the operator's cab 50 is not attached to the second power unit 30B. Thus, as compared to the case where it is necessary to divert the second power unit 30B with the operator's cab 50 attached thereto to an "additional purpose", it becomes possible to reduce a space to be occupied by the second hydraulic power unit 30B when diverted to the "additional purpose". This is advantageous in a situation where the second hydraulic power unit 30B is diverted to an "additional purpose" in a relatively narrow site. In addition, it becomes possible to eliminate a need for a work of detaching the operator's cab 50 from the second hydraulic power unit 30B before diverting the second hydraulic power unit 30B to an "additional purpose", and attaching the operator's cab 50 to the second hydraulic power unit 30B after completion of the diversion of the second hydraulic power unit 30B to the "additional purpose".

(Effect 4)

As illustrated in FIG. 2, the upper slewing body 20 comprises the work platform 60B attached around the second power unit 30B. The work platform 60B is configured to be attachable and detachable or storable with respect to the second power unit 30B.

Thus, in a state in which the work platform 60B is detached from the second power unit 30B, or stored with respect to the second power unit 30B, it becomes possible to reduce a space to be occupied by the second hydraulic power unit 30B when used for an "additional purpose". In addition, in the above state, it becomes possible to facilitate connecting a hydraulic pipe such as the hydraulic hose H (see FIG. 4) to the second hydraulic power unit 30B.

(First Modification)

Figure 7:
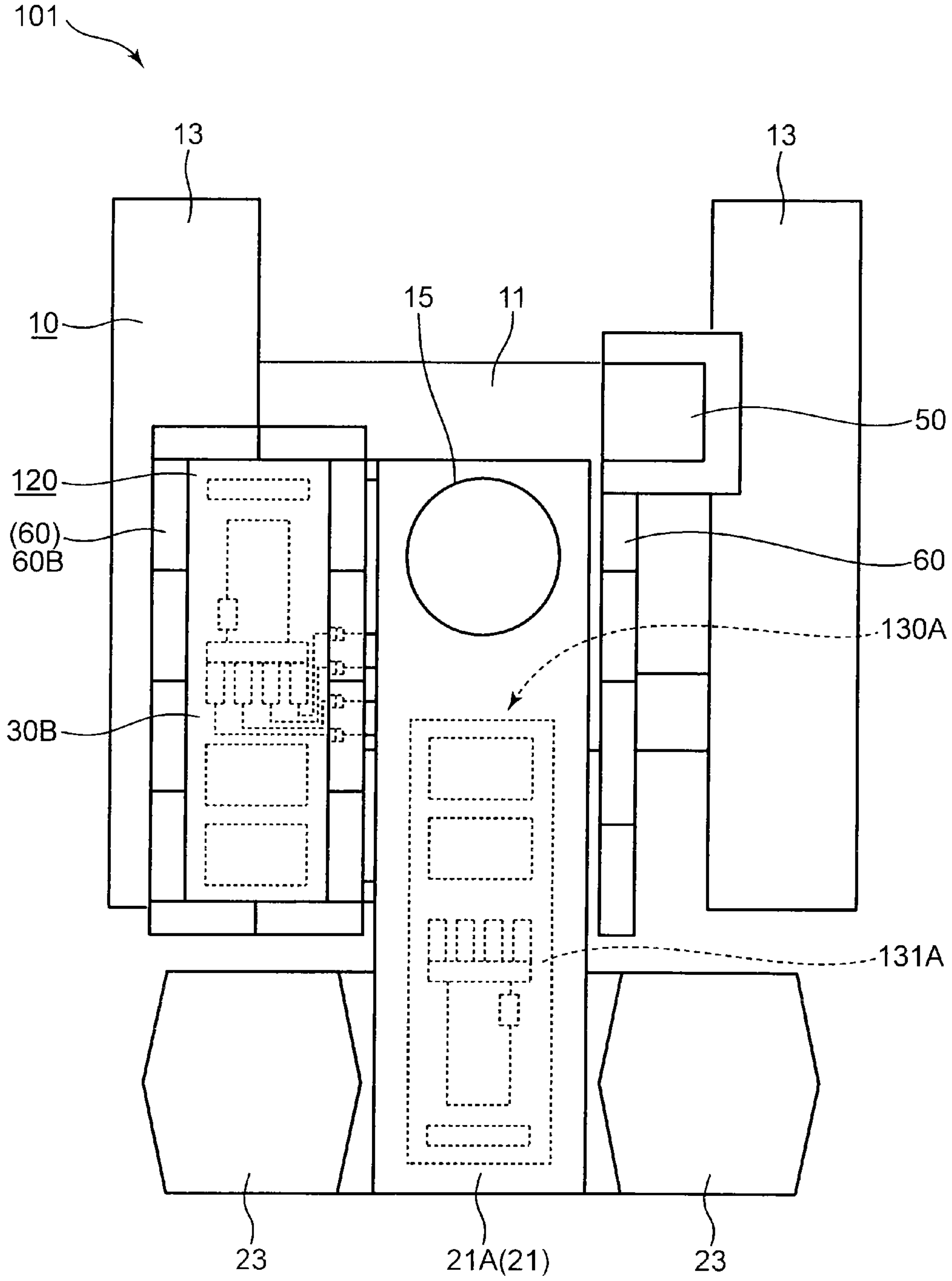
FIG. 7 is a view corresponding to FIG. 2, which illustrates a construction machine according to a first modification of the first embodiment.

FIG. 7 illustrates an upper slewing body 120 of a construction machine 101 according to a first modification of the first embodiment. In the upper slewing body 20 in the first embodiment illustrated in FIG. 2, the first power unit 30A is detachably attached to the right lateral side of the slewing frame 21. Differently, in the upper slewing body 120 in the first modification illustrated in FIG. 7, a first power unit 130A is disposed inside the slewing frame 21. A specific difference between the first power unit 130A in the first modification and the first power unit 30A (see FIG. 2) in the first embodiment is as follows.

The first power unit 130A comprises a first sub-frame 131A, in place of the first side frame 31A (see FIG. 1). The first sub-frame 131A is encompassed within the concept of "first support member" set forth in the appended claims. For example, the first sub-frame 131A may be detachably attached to the slewing frame 21 or may be fixed to the slewing frame 21. The components 32A to 37A (see FIG. 1) comprised in the first power unit 130A may be directly fixed to the slewing frame 21. That is, the first power unit 130A may be devoid of the first sub-frame 131A.

In the upper slewing body 120 in the first modification, the operator's cab 50 is attached to the slewing frame 21. The work platform 60 is also attached to the slewing frame 21.

(Second Modification)

Figure 8:
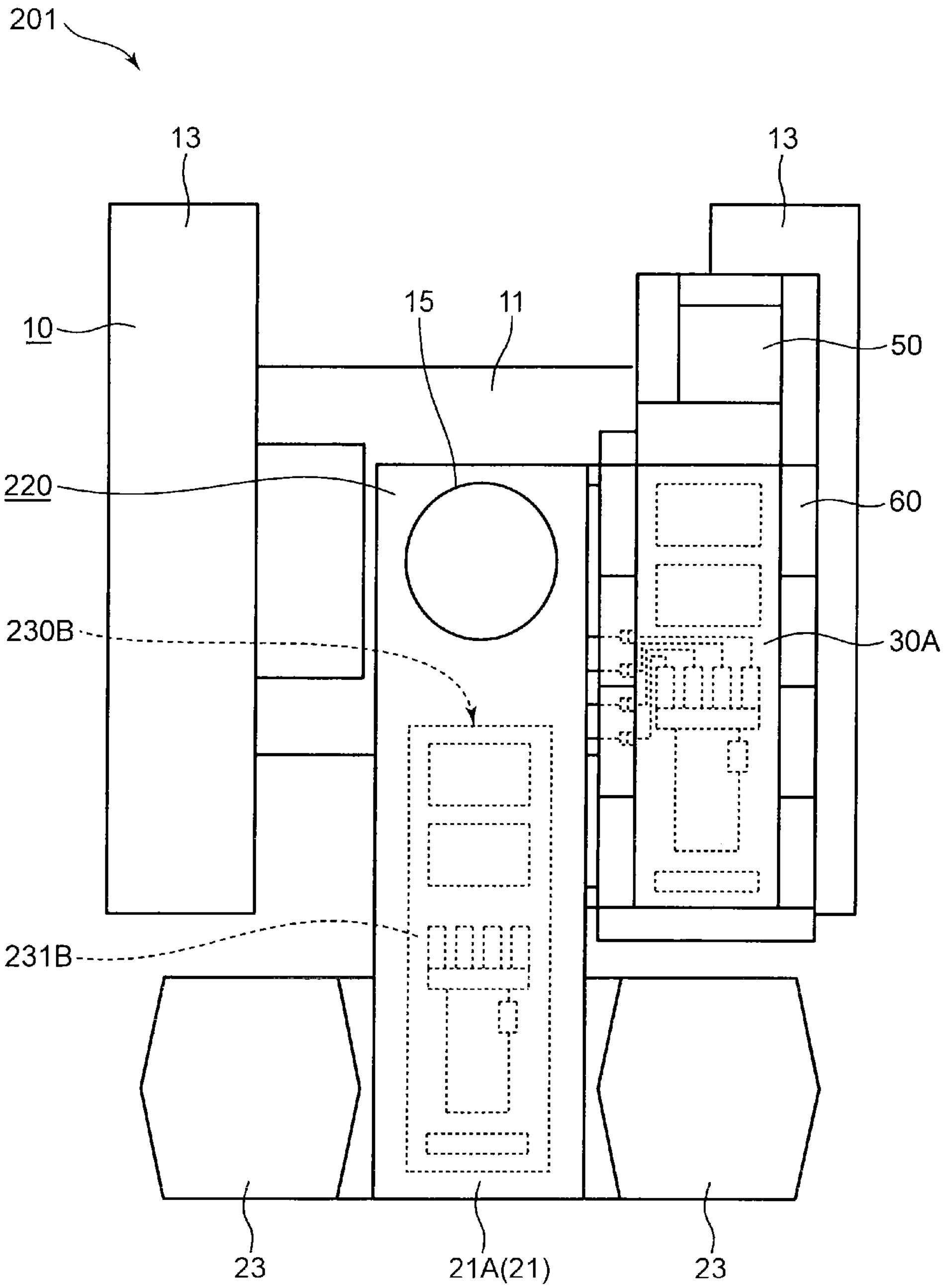
FIG. 8 is a view corresponding to FIG. 2, which illustrates a construction machine according to a second modification of the first embodiment.

FIG. 8 illustrates an upper slewing body 220 of a construction machine 201 according to a second modification of the first embodiment. In the upper slewing body 20 in the first embodiment illustrated in FIG. 2, the second power unit 30B is detachably attached to the left lateral side of the slewing frame 21. Differently, in the upper slewing body 220 in the second modification illustrated in FIG. 8, the second power unit 230B is mounted, disposed or attached on the slewing frame 21. A specific difference between the second power unit 230B in the second modification and the second power unit 30B (see FIG. 2) in the first embodiment is as follows.

The second power unit 230B comprises a second sub-frame 231B, in place of the second side frame 31B (see FIG. 1). The second sub-frame 231B is detachably attached to the slewing frame 21. The second sub-frame 231B and the slewing frame 21 are coupled together, for example, by using a coupling pin.

Second Embodiment

Figure 9:
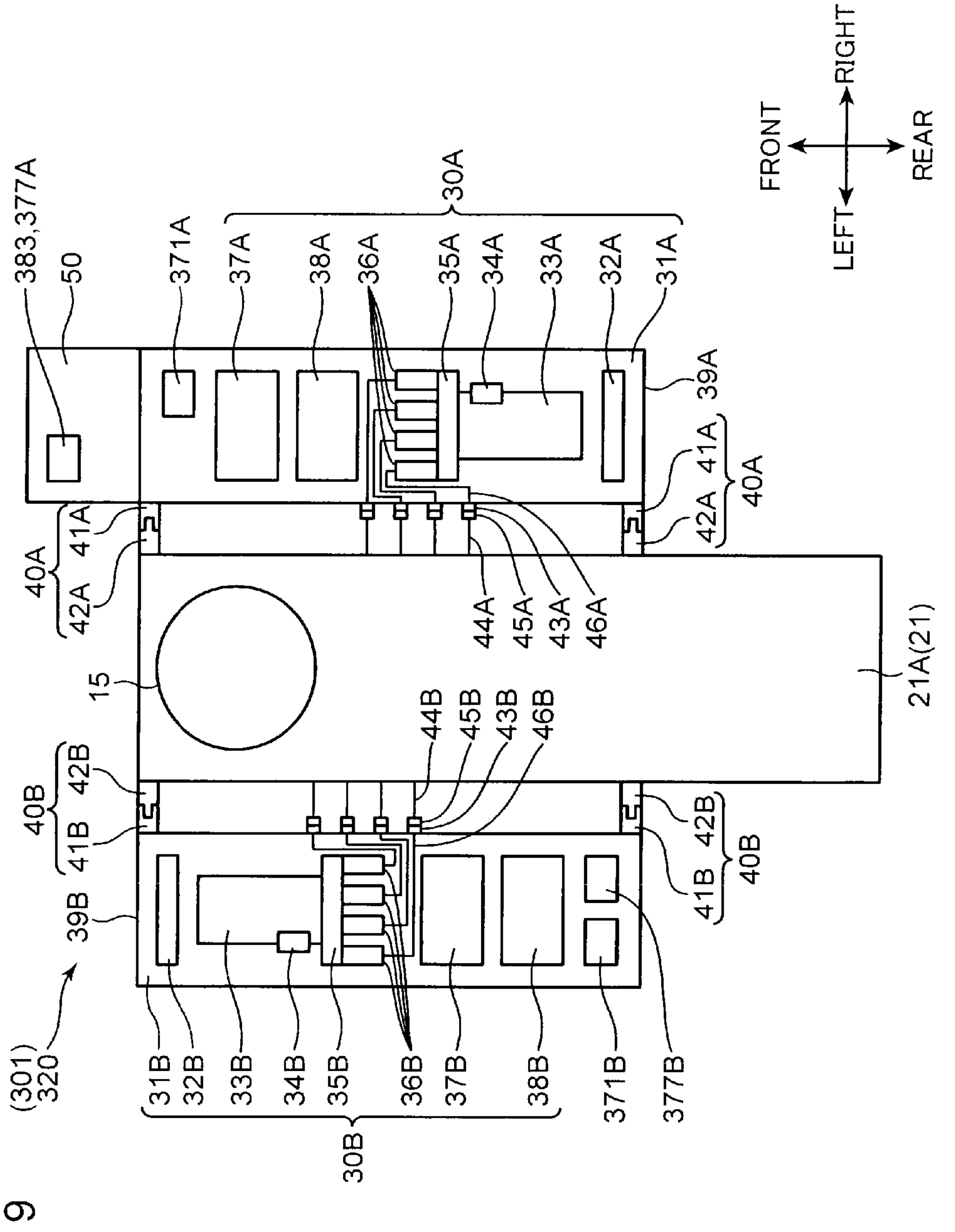
FIG. 9 is a view corresponding to FIG. 1, which illustrates an upper slewing body of a construction machine according to a second embodiment of the present invention.
Figure 10:
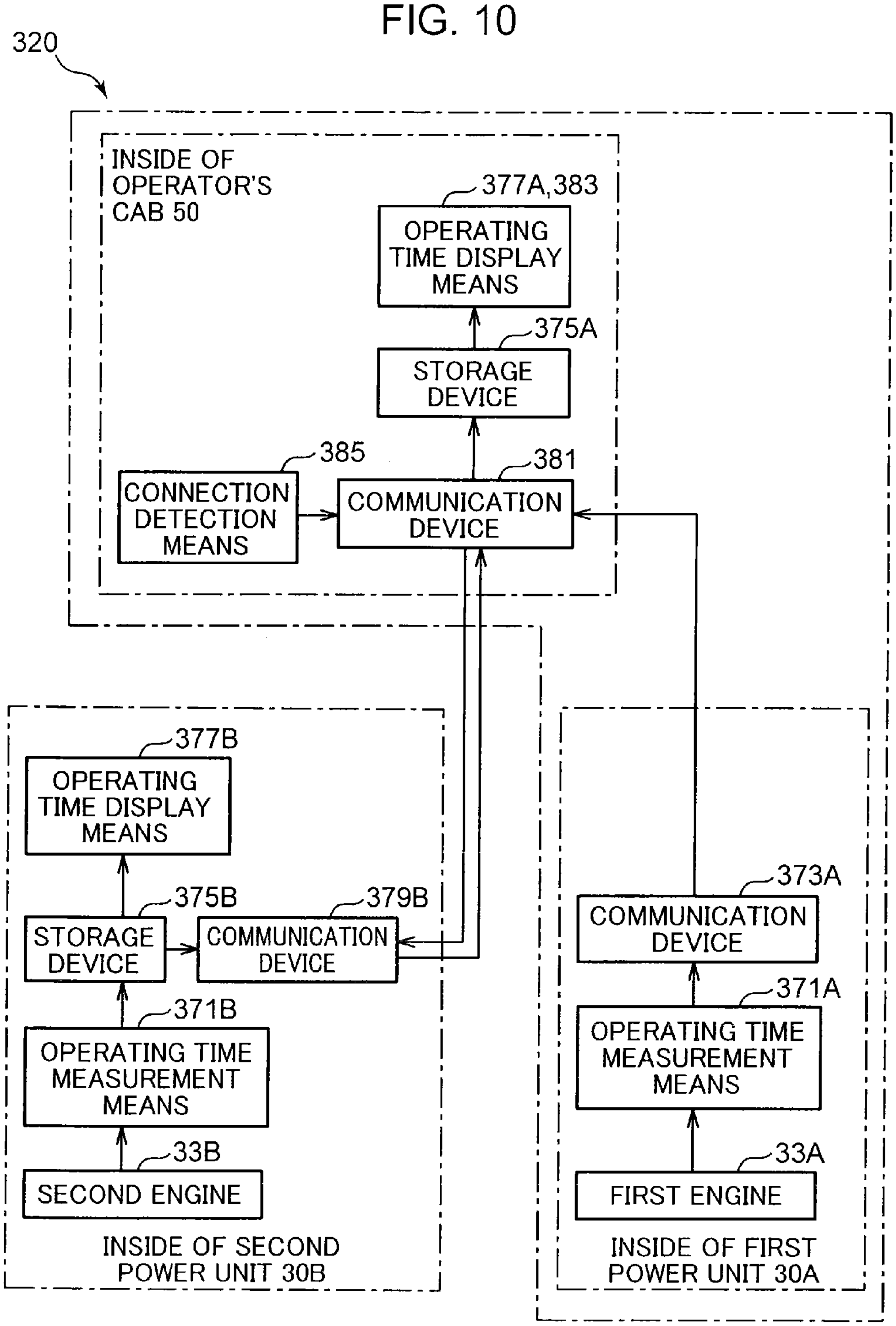
FIG. 10 is a functional block diagram of a part of the upper slewing body illustrated in FIG. 9.
Figure 11:
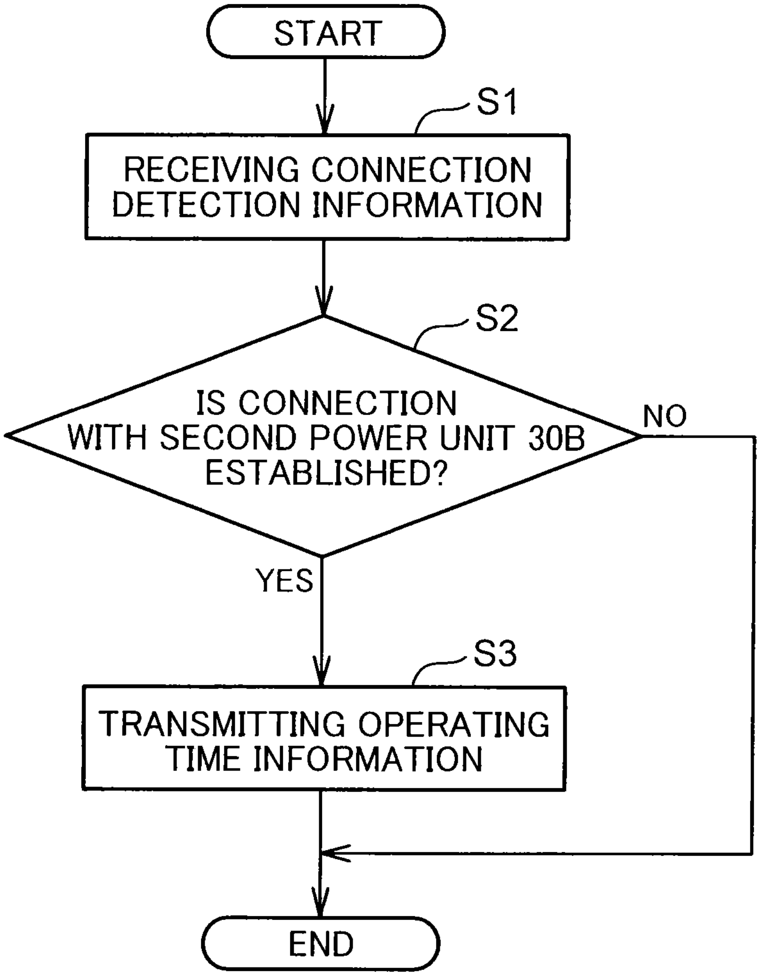
FIG. 11 is a flowchart of processing performed by a communication device, etc., illustrated in FIG. 10.
Figure 12B:
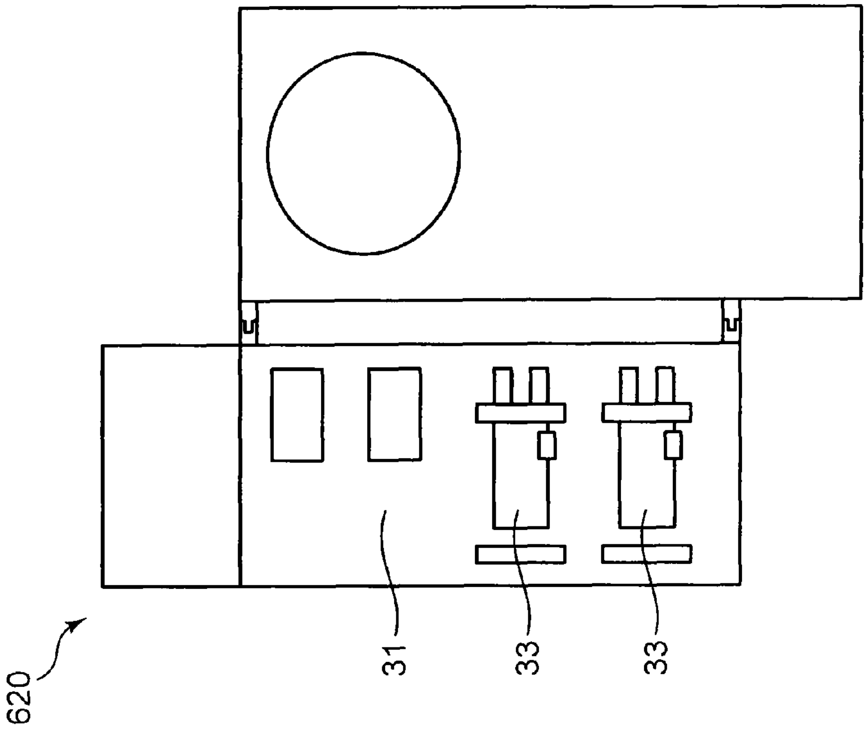
FIGS. 12A and 12B are top plan views of conventional upper slewing bodies.
Figure 12A:
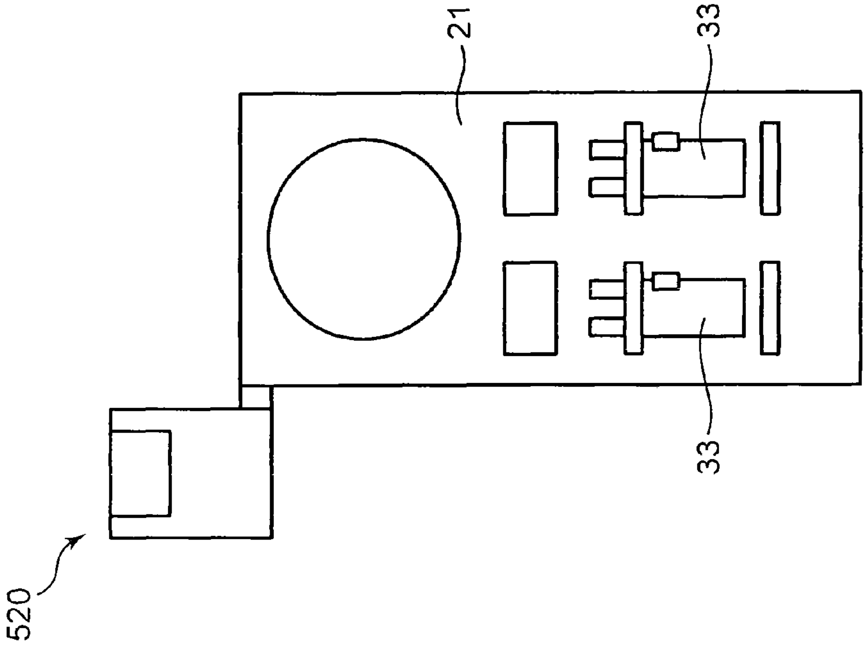
(PRIOR ART) FIG. 12A

With reference to FIGS. 9 to 11, an upper slewing body 320 of a construction machine according to a second embodiment of the present invention will be described in terms of a difference from the upper slewing body 20 (see FIG. 1) in the first embodiment. The upper slewing body 320 in the second embodiment illustrated in FIG. 9 is equivalent to a configuration obtained by adding a component for measuring an operating time of each of the power units 30A, 30B and a component for displaying information about the measured operating time to the upper slewing body 20 in the first embodiment illustrated in FIG. 1.

As illustrated in FIG. 10, the upper slewing body 320 comprises: an operating time measurement means 371A and a communication device 373A each attached to a first power unit 30A (see FIG. 9); and a storage device 375A and an operating time display means 377A each provided, for example, in an operator's cab 50 (see FIG. 9). The upper slewing body 320 also comprises: an operating time measurement means 371B, a storage device 375B, an operating time display means 377B (first operating time display means) and a communication device 379B each attached to a second power unit 30B (see FIG. 9). The upper slewing body 320 further comprises: a communication device 381 provided, for example, in the operator's cab 50 (see FIG. 9); and an operating time display means 383 (second operating time display means) and a connection detection means 385 provided inside the operator's cab 50. With reference to FIG. 10, a detailed configuration of the upper slewing body 320 in the second embodiment will be described below. However, the first power unit 30A, the second power unit 30B and the operator's cab 50 will be described with reference to FIG. 9.

The operating time measurement means 371A is a device for measuring an operating time of the first power unit 30A. The operating time measurement means 371A is attached to the first power unit 30A. More specifically, the operating time measurement means 371A is disposed inside the first power unit 30A or on the first power unit 30A. For example, an operating time measurement method by the operating time measurement means 371A is the same as an aftermentioned operating time measurement method by the operating time measurement means 371B. The operating time measurement means 371A is operable to output information about a measured operating time (hereinafter referred to as "operating time information") to the storage device 375A via the communication device 373A and the communication device 381.

The communication device 373A is a device capable of transferring the operating time information. The communication device 373A is attached to the first power unit 30A. It should be noted that a concept of the situation where the communication device 373A is attached to the first power unit 30A includes a situation where the communication device 373A is disposed inside the first power unit 30A, and a situation where the communication device 373A is attached onto a surface of the first power unit 30A. The same applies to the following description. For example, the same applies to the communication device 379B of the second power unit 30B. The communication device 373A is operable to transfer the operating time information to the communication device 381 provided in the operator's cab 50. The communication device 381 is operable to transfer (output) the operating time information transferred from the communication device 373A, to the storage device 375A.

The storage device 375A is operable to store therein the operating time information of the first power unit 30A transferred from the communication device 381. The storage device 375A is provided in the operator's cab 50. Alternatively, the storage device 375A may be attached to the first power unit 30A. The storage device 375A is operable to output the operating time information of the first power unit 30A to the operating time display means 377A.

The operating time display means 377A is operable to display the operating time information of the first power unit 30A received from the storage device 375A. The operating time display means 377A is disposed inside the operator's cab 50. The operating time display means 377A is a device (hour meter) for display a numeric character indicative of an operating time. Alternatively, the operating time display means 377A may be configured to display a graphic and/or a symbol corresponding to an operating time. The same applies to the operating time display means 377B and the operating time display means 383.

The operating time measurement means 371B is a device for measuring an operating time of the second power unit 30B. The operating time measurement means 371B is attached to the second power unit 30B. More specifically, the operating time measurement means 371B is disposed inside the second power unit 30B. The operating time measurement means 371B is a device separate from the operating time measurement means 371A for the first power unit 30A, i.e., a device dedicated to the second power unit 30B.

The operating time measurement means 371B is operable to detect the presence or absence of a movement or operation of a device or component constituting the second power unit 30B, such as a mechanical movement, an electrical operation or a movement of hydraulic oil, and measure a time period having such a movement or operation, as an operating time. More specifically, for example, the operating time measurement means 371B illustrated in FIG. 9 is operable to detect the presence or absence of a movement or operation of a movable member (e.g., a rotary shaft) of a second engine 33B, a second power divider 35B or a second hydraulic pump 36B, and measure a time period having such a movement or operation, as an operating time. When the operating time measurement means 371B is configured to measure a time period having a movement or operation of the second engine 33B, it is operable to measure a time period between a time when a starter key for starting the second engine 33B is turned on, and a time when the starter key is subsequently turned off. As another example, the operating time measurement means 371B may be configured to detect an operation of a second controller 34B for controlling the second engine 33B, and measure a time period having the operation of the second controller 34B as an operating time. As yet another example, the operating time measurement means 371B may be configured to detect the presence or absence of a flow of hydraulic oil sucked by or discharged from the second hydraulic pump 36B, and measure a time period having the flow of hydraulic oil as an operating time. The operating time measurement means 371B is operable to output information about a measured operating time (operating time information) to the storage device 375B (see FIG. 9).

The storage device 375B is operable to store therein the operating time information of the second power unit 30B received from the operating time measurement means 371B. The storage device 375B is provided in the second power unit 30B. The storage device 375B is operable to output the operating time information of the second power unit 30B to the operating time display means 383 via the communication device 379B and the communication device 381.

The operating time display means 377B (first operating time display means) is operable to display the operating time information measured by the operating time measurement means 371B, specifically, a numeric character or the like indicative of an operation time. The operating time display means 377B is attached to the second power unit 30B.

The communication device 379B is a device capable of transferring the operating time information. The communication device 379B is attached to the second power unit 30B. The communication device 379B is operable to receive (after-mentioned) connection detection information output from the connection detection means 385. The communication device 379B is operable to transfer, to the communication device 381 in the operator's cab 50, the operating time information input from the storage device 375B, i.e., the operating time information of the second power unit 30B measured by the operating time measurement means 371B. Communication between the communication device 379B and the communication device 381 may be wire communication or may be wireless communication. The same applies to communication between the communication device 381 and the communication device 373A. The communication device 381 is operable to transfer (output) the operating time information of second power unit 30B transferred from the communication device 379B, to the storage device 375A. The storage device 375A is operable to store therein the operating time information of the second power unit 30B transferred from the communication device 381. The storage device 375A is operable to output the operating time information of the second power unit 30B to the operating time display means 383.

The operating time display means 383 (second operating time display means) is operable to display the operating time information of the second power unit 30B received from the storage device 375A. The operating time display means 383 is disposed inside the operator's cab 50. The operating time display means 383 is a device for display a numeric character or the like indicative of an operating time. The operating time display means 383 for displaying the operating time information of the second power unit 30B and the operating time display means 377A for displaying the operating time information of the first power unit 30A may be separate from each other or may be integrated together.

The connection detection means 385 is a device for detecting whether or not a slewing frame 21 illustrated in FIG. 9 and the second power unit 30B are connected together. As illustrated in FIG. 10, the connection detection means 385 is provided, for example, in the operator's cab 50. Alternatively, the connection detection means 385 may be attached to the slewing frame 21 or the second power unit 30B. The connection detection means 385 is operable to output, to the communication device 379B, connection detection information indicative of the presence or absence of a connection between the slewing frame 21 and the second power unit 30B. For example, the connection detection information indicates "connection" or "non-connection". Specifically, the connection detection means 385 is operable to detect the presence or absence of a coupling between a left slewing frame bracket 42B of the slewing frame 21 and a second side frame bracket 41B of a second side frame 31B. Then, the connection detection means 385 is operable, when it detects that the two brackets 42B, 41B are coupled together, to output the connection detection information indicative of "connection", and, when it detects that the two brackets 42B, 41B are not coupled, to output the connection detection information indicative of "non-connection". The connection detection means 385 is configured to detect the presence or absence of a connection between the slewing frame 21 and the second power unit 30B, for example, by detecting the presence or absence of an electrical connection or a mechanical connection. More specifically, the above detection by the connection detection means 385 is performed, for example, by detecting the presence or absence of an electrical connection between the second power unit 30B and the operator's cab 50 or the slewing frame 21 each illustrated in FIG. 9, more specifically, between the second controller 34B for controlling the second engine 33B and the operator's cab 50. Alternatively, the above detection by the connection detection means 385 may be performed, for example, by detecting the presence or absence of a coupling in a second power unit attaching-detaching mechanism 40B, specifically, the presence or absence of a connection pin.

(Operation)

With reference to a flowchart in FIG. 11, an operation of the upper slewing body 320 when the slewing frame 21 and the second power unit 30B are connected together will be described. However, configurations of the first power unit 30A, the second power unit 30B and the operator's cab 50 will be described with reference to FIG. 9.

Firstly, in Step S1, the communication device 379B illustrated in FIG. 10 receives the connection detection information from the connection detection means 385 via the communication device 381.

Then, in Steps S2 and S3, when the connection detection means 385 (see FIG. 10) detects that the slewing frame 21 and the second power unit 30B are connected together, i.e., when the determination in Step S2 is YES, the communication device 379B (see FIG. 10) automatically transfers the operating time information of the second power unit 30B to the operating time display means 383 via the communication device 381 and the storage device 375A. Details (specific example) of operation in this case are as follows. The connection detection means 385 outputs the connection detection information indicative of "connection" to the communication device 379B via the communication device 381. In response to receiving the connection detection information from the connection detection means 385, the communication device 379B reads the operating time information of the second power unit 30B from the storage device 375B. Then, the communication device 379B transfers the read operating time information of the second power unit 30B, to the operating time display means 383 inside the operator's cab 50 via the communication device 381 and the storage device 375A. As a result, the operating time information of the second power unit 30B is displayed on the operating time display means 383.

When the slewing frame 21 and the second power unit 30B are not connected, i.e., when the determination in Step S2 in FIG. 11 is NO, the communication device 379B (see FIG. 10) is maintained in a standby state in which the operating time information of the second power unit 30B is not transferred, and the process flow returns to START.

(Effect 1)

Next, an advantageous effect obtainable by the upper slewing body 320 in the second embodiment will be described.

The upper slewing body 320 comprises the operating time measurement means 371B attached to the second power unit 30B and configured to measure an operating time of the second power unit 30B, and the operating time display means 377B attached to the second power unit 30B and configured to display operating time information measured by the operating time measurement means 371B.

The upper slewing body 320 has the operating time display means 377B for displaying the operating time information measured by the operating time measurement means 371B, so that, based on the operating time information displayed on the operating time display means 377B, a user of the second power unit 30B can perform a periodic inspection of the second power unit 30B and/or a replacement of a consumable component of the second power unit 30B, at an appropriate timing. Thus, it becomes possible to suppress a failure of the second power unit 30B.

Further, the operating time display means 377B is attached to the second power unit 30B, so that, even when the second power unit 30B is detached from the slewing frame 21, a user of the second power unit 30B can ascertain the operating time information of the second power unit 30B.

Details of these effects are as follows. Heretofore, a construction machine has been equipped with an hour meter corresponding to the operating time display means 383, in the operator's cab 50. The hour meter is designed to display operating time information of an engine corresponding to the first engine 33A, or the like. Based on the operating time information displayed on the hour meter, a user or owner of the construction machine performs a periodic inspection of the engine or the like and/or a replacement of a consumable component. However, in the upper slewing body 320 (see FIG. 9) in the second embodiment, the first power unit 30A and the second power unit 30B can be operated independently, so that the conventional hour meter is likely to fail to accurately display the operating time information of each of the power units 30A, 30B. Specifically, for example, assume that the hour meter is configured to display only operating time information of the first power unit 30A, and the second power unit 30B is diverted to an "additional purpose" without operating the first power unit 30A. In this case, an actual operating time of the second power unit 30B becomes greater than an operating time displayed on the hour meter. Thus, if a user of the construction machine performs a periodic inspection and/or a component replacement for the second power unit 30B based on the operating time information displayed on the hour meter, a timing of the inspection or component replacement will be delayed. The delay of the timing is liable to lead to a failure of the second power unit 30B. In contrast, in the upper slewing body 320 in the second embodiment, the operating time display means 377B is operable to display the operating time information of the second power unit 30B, so that a user of the second power unit 30B can ascertain accurate operating time information of the second power unit 30B. Thus, it becomes possible to suppress a failure of the second power unit 30B.

(Effect 2)

The upper slewing body 320 comprises the operating time measurement means 371B attached to the second power unit 30B and configured to measure an operating time of the second power unit 30B, the communication device 379B (see FIG. 10) capable of transferring the operating time information measured by the operating time measurement means 371B, and the operating time display means 383 provided inside the operator's cab 50 and configured to display the operating time information transferred by the communication device 379B (see FIG. 10).

In this configuration, the operating time information of the second power unit 30B is displayed on the operating time display means 383 inside the operator's cab 50. Thus, a user in the operator's cab 50 can readily ascertain the operating time information of the second power unit 30B without moving from the operator's cab 50 to the second power unit 30B. Therefore, the upper slewing body 320 is highly convenient for the user.

(Effect 3)

The upper slewing body 320 comprises the connection detection means 385 (see FIG. 10) configured to detect whether or not the slewing frame 21 and the second power unit 30B are connected together. The communication device 379B is operable, when the connection detection means 385 detects that the slewing frame 21 and the second power unit 30B are connected together, to automatically transfer the operating time information of the second power unit 30B (see FIG. 9) to the operating time display means 383.

In this configuration, the operating time information of the second power unit 30B is transferred to the operating time display means 383 without a need for a special manual operation of a user of the upper slewing body 320. Therefore, the upper slewing body 320 is more highly convenient for the user.

(Modification)

The operating time information of the second power unit 30B may be transferred to the operating time display means 383, in response to a given manual operation of a user of the upper slewing body 320 to be performed when the slewing frame 21 and the second power unit 30B are connected together. For example, the given manual operation may be a manual operation of an operating time information transfer switch (not illustrated) provided in the operator's cab 50.

Outline of Embodiments

The above embodiments will be outlined as follows.

A construction machine according to the above embodiments comprises: a lower body; an upper slewing body mounted on the lower body and configured to slew with respect to the lower body; and a hydraulic actuator provided in at least one of the lower body and the upper slewing body and configured to be actuated by receiving a supply of hydraulic oil, wherein: the upper slewing body comprises a slewing frame slewably mounted on the lower body, a first power unit configured to supply hydraulic oil for actuating the hydraulic actuator, and a second power unit configured to supply hydraulic oil for actuating the hydraulic actuator, and wherein the first power unit comprises a first engine, a first controller configured to control driving of the first engine, a first hydraulic oil tank configured to store hydraulic oil, a first hydraulic pump configured to be driven by the first engine to thereby suck hydraulic oil from the first hydraulic oil tank and discharge the hydraulic oil toward the hydraulic actuator, a first fuel tank configured to store fuel to be consumed by the first engine, and a first support member attached to the slewing frame to support the first engine, the first hydraulic oil tank, the first hydraulic pump and the first fuel tank; and the second power unit comprises a second engine, a second controller configured to control driving of the second engine, a second hydraulic oil tank configured to store hydraulic oil, a second hydraulic pump configured to be driven by the second engine to thereby suck hydraulic oil from the second hydraulic oil tank and discharge the hydraulic oil toward the hydraulic actuator, a second fuel tank configured to store fuel to be consumed by the second engine, and a second support member supporting the second engine, the second hydraulic oil tank, the second hydraulic pump and the second fuel tank, and wherein the second support member is configured to be attachable and detachable with respect to the slewing frame independently of the first support member, and the second hydraulic pump is detachably connected to the hydraulic actuator.

Preferably, in the above construction machine, the slewing frame has a slewing frame bracket, wherein the second support member has a second support member bracket separably coupled to the slewing frame bracket, and wherein the upper slewing body further comprises an actuator-side hydraulic pipe configured to allow hydraulic oil to flow to the hydraulic actuator therethrough, and an actuator-side coupling member provided at an end of the actuator-side hydraulic pipe on a side opposite to the hydraulic actuator, and wherein the second power unit further comprises a pump-side hydraulic pipe connected to the second hydraulic pump to allow hydraulic oil discharged from the second hydraulic pump to flow therethrough, and a pump-side coupling member provided at an end of the pump-side hydraulic pipe on a side opposite to the second hydraulic pump and separably coupled to the actuator-side coupling member, and wherein the pump-side coupling member is configured to be coupled to the actuator-side coupling member to allow hydraulic oil discharged from the second hydraulic pump into the pump-side hydraulic pipe to flow from the pump-side hydraulic pipe to the actuator-side hydraulic pipe.

Preferably, this construction machine further comprises: an auxiliary actuator which is a hydraulic actuator used in assembling of the construction machine; an auxiliary hydraulic pipe connected to the auxiliary actuator and configured to allow hydraulic oil to flow to the auxiliary actuator therethrough; and an auxiliary pipe coupling member provided at an end of the auxiliary hydraulic pipe on a side opposite to the auxiliary actuator, wherein the pump-side coupling member is configured to be coupleable to the auxiliary pipe coupling member, and, when the pump-side coupling member is coupled to the auxiliary pipe coupling member, to allow hydraulic oil discharged from the second hydraulic pump into the pump-side hydraulic pipe to flow to the auxiliary hydraulic pipe.

Preferably, in the above construction machine, the first support member is configured to be attachable and detachable with respect to the slewing frame independently of the second support member, and the first hydraulic pump is detachably connected to the hydraulic actuator.

In the above construction machine, the upper slewing body may comprise an operator's cab attached to the slewing frame, or may comprise an operator's cab attached to the first support member of the first power unit.

Preferably, in the construction machine where the upper slewing body comprises the operator's cab, the upper slewing body further comprises: an operating time measurement means attached to the second power unit and configured to measure an operating time of the second power unit; a communication device configured to be capable of transferring information about the operating time measured by the operating time measurement means; and an operating time display means provided inside the operator's cab and configured to display information about the operating time transferred by the communication device.

Preferably, in the construction machine where the upper slewing body comprises the operating time display means, the upper slewing body further comprises a connection detection means configured to detect whether or not the second support member is connected to the slewing frame, and wherein the communication device is operable, when the connection detection means detects that the second support member is connected to the slewing frame and in response to the detection, to automatically transfer the information about the operating time to the operating time display means.

Preferably, in the above construction machine, the upper slewing body further comprises an operating time measurement means attached to the second power unit and configured to measure an operating time of the second power unit, and a first operating time display means attached to the second power unit and configured to display information about the operating time measured by the operating time measurement means.

Preferably, in this construction machine, the upper slewing body further comprises a communication device configured to be capable of transferring the information about the operating time measured by the operating time measurement means, and a second operating time display means provided inside an operator's cab and configured to display the information about the operating time transferred by the communication device.

More preferably, in this construction machine, the upper slewing body further comprises a connection detection means configured to detect whether or not the second support member is connected to the slewing frame, wherein the communication device is operable, when the connection detection means detects that the second support member is connected to the slewing frame and in response to the detection, to automatically transfer the information about the operating time to the second operating time display means.

In the above construction machine, the upper slewing body may further comprise a work platform attached around the second power unit, wherein the work platform is configured to be attachable and detachable with respect to the second power unit.

In the above construction machine, the upper slewing body may further comprise a work platform attached around the second power unit, wherein the work platform is configured to be storable inside the second power unit.

As described above, in the above embodiments, a power unit can be diverted to an additional purpose different from a primary operation of a construction machine, and it becomes possible to downsize the power unit, while enhancing flexibility in utilization of the power unit.

This application is based on Japanese Patent application No. 2012-153753 filed in Japan Patent Office on Jul. 9, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine comprising:
a lower body;
an upper slewing body mounted on the lower body and configured to slew with respect to the lower body; and
a hydraulic actuator provided in at least one of the lower body and the upper slewing body and configured to be actuated by receiving a supply of hydraulic oil,
wherein:
the upper slewing body comprises
a slewing frame slewably mounted on the lower body,
a first power unit configured to supply hydraulic oil for actuating the hydraulic actuator, and
a second power unit configured to supply hydraulic oil for actuating the hydraulic actuator,
and wherein
the first power unit comprises
a first engine,
a first controller configured to control driving of the first engine,
a first hydraulic oil tank configured to store hydraulic oil,
a first hydraulic pump configured to be driven by the first engine to thereby suck hydraulic oil from the first hydraulic oil tank and discharge the hydraulic oil toward the hydraulic actuator,
a first fuel tank configured to store fuel to be consumed by the first engine, and
a first support member attached to the slewing frame to support the first engine, the first hydraulic oil tank, the first hydraulic pump and the first fuel tank; and
the second power unit comprises
a second engine,
a second controller configured to control driving of the second engine,
a second hydraulic oil tank configured to store hydraulic oil,
a second hydraulic pump configured to be driven by the second engine to thereby suck hydraulic oil from the second hydraulic oil tank and discharge the hydraulic oil toward the hydraulic actuator,
a second fuel tank configured to store fuel to be consumed by the second engine, and
a second support member supporting the second engine, the second hydraulic oil tank, the second hydraulic pump and the second fuel tank,
and wherein
the second support member is configured to be attachable and detachable with respect to the slewing frame independently of the first support member, and
the second hydraulic pump is detachably connected to the hydraulic actuator.

2. The construction machine as defined in claim 1, wherein:
the slewing frame has a slewing frame bracket, and wherein the second support member has a second support member bracket separably coupled to the slewing frame bracket; and
the upper slewing body further comprises
an actuator-side hydraulic pipe configured to allow hydraulic oil to flow to the hydraulic actuator therethrough, and
an actuator-side coupling member provided at an end of the actuator-side hydraulic pipe on a side opposite to the hydraulic actuator,
and wherein the second power unit further comprises
a pump-side hydraulic pipe connected to the second hydraulic pump to allow hydraulic oil discharged from the second hydraulic pump to flow therethrough, and
a pump-side coupling member provided at an end of the pump-side hydraulic pipe on a side opposite to the second hydraulic pump and separably coupled to the actuator-side coupling member, the pump-side coupling member being configured to be coupled to the actuator-side coupling member to allow hydraulic oil discharged from the second hydraulic pump into the pump-side hydraulic pipe to flow from the pump-side hydraulic pipe to the actuator-side hydraulic pipe.

3. The construction machine as defined in claim 2, which further comprises:
an auxiliary actuator which is a hydraulic actuator used in assembling of the construction machine;
an auxiliary hydraulic pipe connected to the auxiliary actuator and configured to allow hydraulic oil to flow to the auxiliary actuator therethrough; and
an auxiliary pipe coupling member provided at an end of the auxiliary hydraulic pipe on a side opposite to the auxiliary actuator,
wherein the pump-side coupling member is configured to be coupleable to the auxiliary pipe coupling member, and, when the pump-side coupling member is coupled to the auxiliary pipe coupling member, to allow hydraulic oil discharged from the second hydraulic pump into the pump-side hydraulic pipe to flow to the auxiliary hydraulic pipe.

4. The construction machine as defined in claim 1, wherein
the first support member is configured to be attachable and detachable with respect to the slewing frame independently of the second support member, and
the first hydraulic pump is detachably connected to the hydraulic actuator.

5. The construction machine as defined in claim 1, wherein the upper slewing body further comprises an operator's cab attached to the slewing frame or the first support member of the first power unit.

6. The construction machine as defined in claim 5, wherein the upper slewing body further comprises:
an operating time measurement means attached to the second power unit and configured to measure an operating time of the second power unit;
a communication device configured to be capable of transferring information about the operating time measured by the operating time measurement means; and
an operating time display means provided inside the operator's cab and configured to display information about the operating time transferred by the communication device.

7. The construction machine as defined in claim 6, wherein the upper slewing body further comprises a connection detection means configured to detect whether or not the second support member is connected to the slewing frame, and wherein the communication device is operable, when the connection detection means detects that the second support member is connected to the slewing frame and in response to the detection, to automatically transfer the information about the operating time to the operating time display means.

8. The construction machine as defined in claim 1, wherein the upper slewing body further comprises:
an operating time measurement means attached to the second power unit and configured to measure an operating time of the second power unit; and a first operating time display means attached to the second power unit and configured to display information about the operating time measured by the operating time measurement means.

9. The construction machine as defined in claim 8, wherein the upper slewing body further comprises:

a communication device configured to be capable of transferring the information about the operating time measured by the operating time measurement means; and a second operating time display means provided inside an operator's cab and configured to display the information about the operating time transferred by the communication device.

10. The construction machine as defined in claim 9, wherein the upper slewing body further comprises a connection detection means configured to detect whether or not the second support member is connected to the slewing frame, and wherein the communication device is operable, when the connection detection means detects that the second support member is connected to the slewing frame and in response to the detection, to automatically transfer the information about the operating time to the second operating time display means.

11. The construction machine as defined in claim 1, wherein the upper slewing body further comprises a work platform attached around the second power unit, the work platform being configured to be attachable and detachable with respect to the second power unit.

12. The construction machine as defined in claim 1, wherein the upper slewing body further comprises a work platform attached around the second power unit, the work platform being configured to be storable inside the second power unit.

* * * * *